(12) United States Patent
Gallus

(10) Patent No.: US 6,387,322 B1
(45) Date of Patent: May 14, 2002

(54) SYSTEM AND METHOD FOR HEATING AND THEN COOLING CONTENTS OF FLEXIBLE CONTAINERS

(76) Inventor: Timothy David Gallus, 35 Leebarry La., Las Cruces, NM (US) 88012

(*) Notice: Subject to any disclaimer, the term of this patent is extended or adjusted under 35 U.S.C. 154(b) by 0 days.

(21) Appl. No.: 09/277,289

(22) Filed: Mar. 26, 1999

(51) Int. Cl.[7] .................................................. A61L 2/00
(52) U.S. Cl. ........................ 422/38; 99/483; 426/417; 422/40; 422/307; 422/308; 422/309
(58) Field of Search .................... 99/483; 426/417; 422/40, 38, 307, 308, 309

(56) References Cited

U.S. PATENT DOCUMENTS

| | | |
|---|---|---|
| 3,966,980 A | 6/1976 | McGuckian |
| 4,306,857 A | 12/1981 | Hofstetter et al. |
| 4,384,463 A | 5/1983 | Rica et al. |
| 4,384,849 A | 5/1983 | Marchetti |
| 4,385,035 A | 5/1983 | Akitoshi et al. |
| 4,403,479 A | 9/1983 | Rasovich |
| 4,437,315 A | 3/1984 | Rica et al. |
| 4,457,702 A | 7/1984 | Marchetti |
| 4,505,670 A | 3/1985 | Silvestrini et al. |
| 4,565,452 A | 1/1986 | Wild |
| 4,619,191 A | 10/1986 | Dumas et al. ................. 99/483 |
| 4,627,224 A | 12/1986 | Hamamoto et al. |
| 4,702,161 A | 10/1987 | Andersen |
| 4,858,445 A | 8/1989 | Rasovich |
| 4,929,459 A | 5/1990 | Silvestrini |
| 5,009,150 A | 4/1991 | Andersen |
| 5,243,833 A | 9/1993 | Coelho et al. ................. 62/376 |
| 5,259,212 A | 11/1993 | Eagler |
| 5,351,495 A | 10/1994 | Lemuzeaux |
| 5,370,174 A | 12/1994 | Silvestrini et al. |
| 5,374,435 A | 12/1994 | Silvestrini et al. |
| 5,377,492 A | 1/1995 | Robertson et al. |
| 5,417,074 A | 5/1995 | McAfee et al. |
| 5,494,691 A | 2/1996 | Sizer |
| 5,555,702 A | 9/1996 | Sizer |
| 5,630,327 A | 5/1997 | Kiczek et al. |
| 5,644,977 A | 7/1997 | Rodriguez |
| 5,766,002 A | 6/1998 | Silvestrini |
| 5,809,787 A | 9/1998 | Zittel |

*Primary Examiner*—Krisanne Thornton
(74) *Attorney, Agent, or Firm*—Andrea L. Mays; Deborah A. Peacock; Rod D. Baker

(57) ABSTRACT

A fluid conveyor jet moves flexible containers or bags along a trough from one station to the next in the trough in a process which efficiently heats or cools the contents of the containers. Side fluid jets positioned along opposite sides of the trough direct heating or cooling fluid (water) on the flexible containers at the stations. They direct the fluid generally in spaced horizontal planes on the flexible containers therebetween causing (1) the central contents of the containers to move away from central areas of the container towards the sides to promote temperature transfer between the contents and cooling or heating fluid from the fluid jet conveyor and the fluid jets and (2) the containers to rotate generally about axes parallel to a longitudinal axis of the trough also helping in the cooling or heating process. The side fluid jets are operatively positioned below the waterline of the trough. The fluid conveyor jet and the side fluid jets act alternately whereby the fluid conveyor jet moves the flexible containers from one active station to the next, and at each active station the side fluid jets are activated to massage the central contents towards the skin of the containers and to rotate the containers in the cooling or heating fluid in the trough. Thorough and efficient cooling or heating of product in the flexible containers results. This process can be used to heat product in sealed flexible containers and also to subsequently cool the sterilized product in the containers.

34 Claims, 22 Drawing Sheets

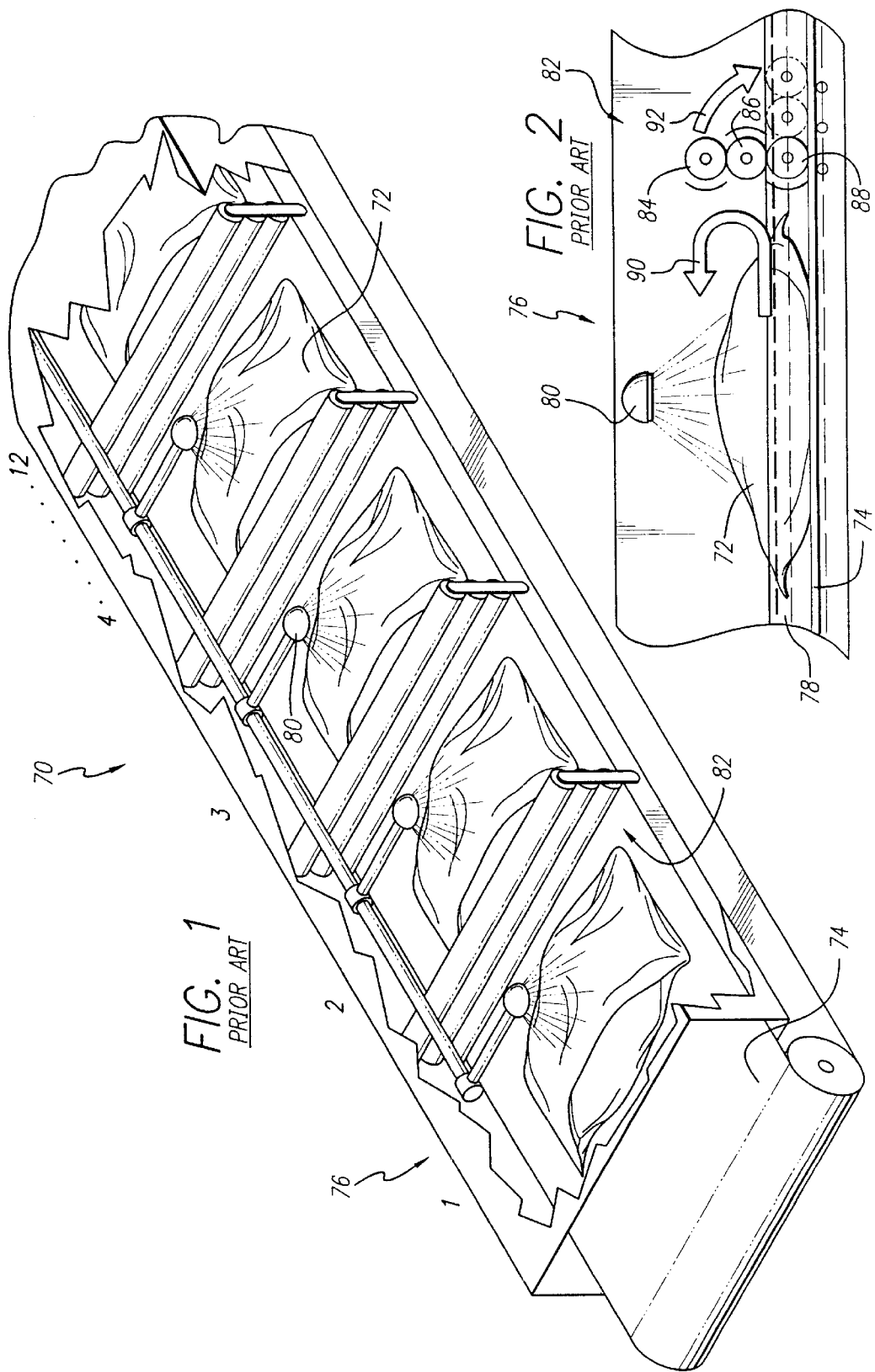

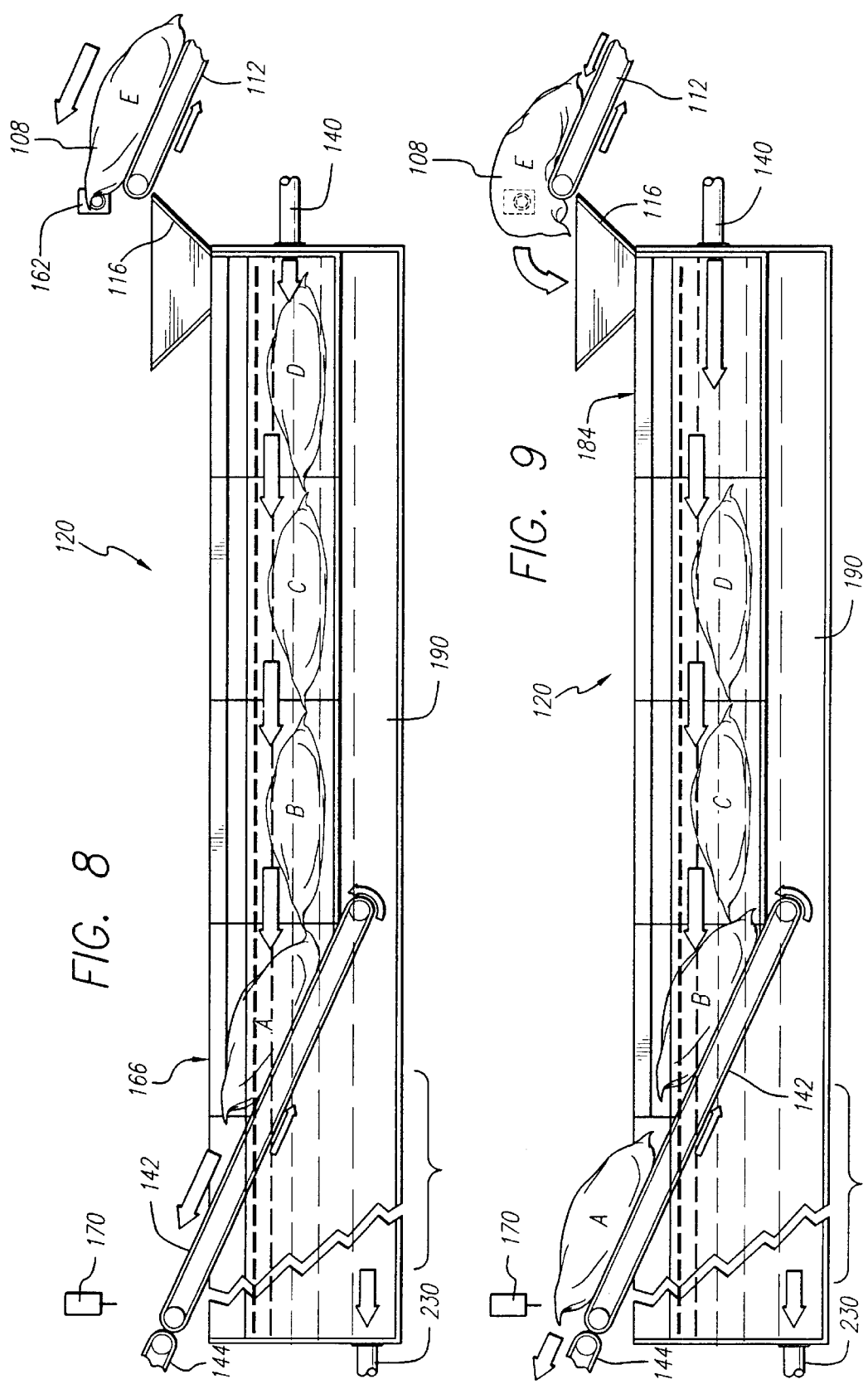

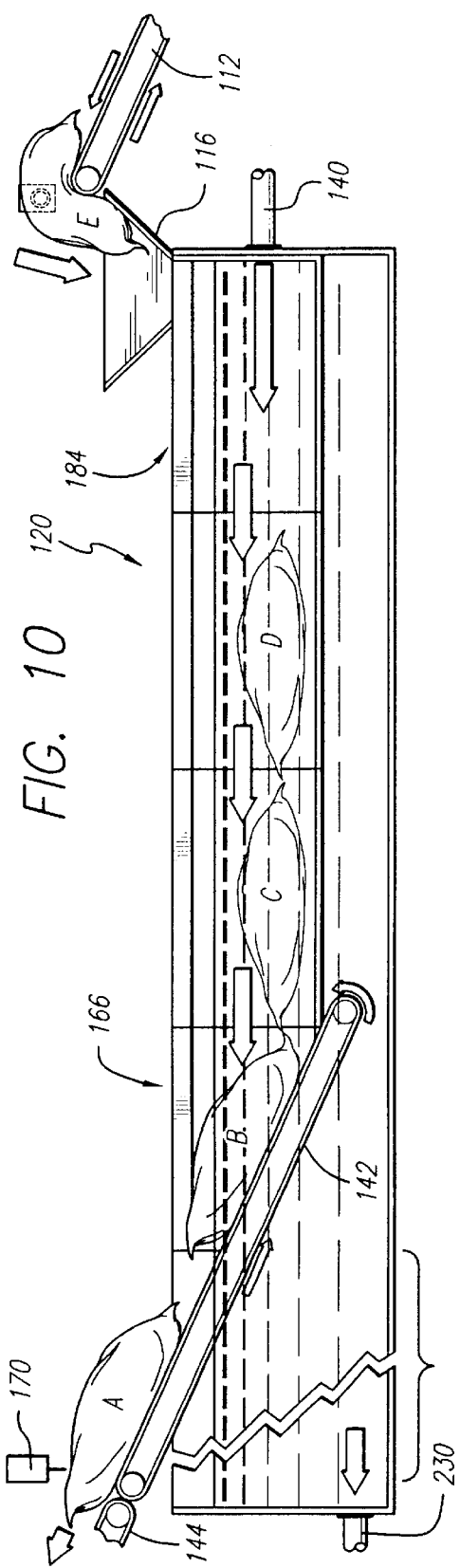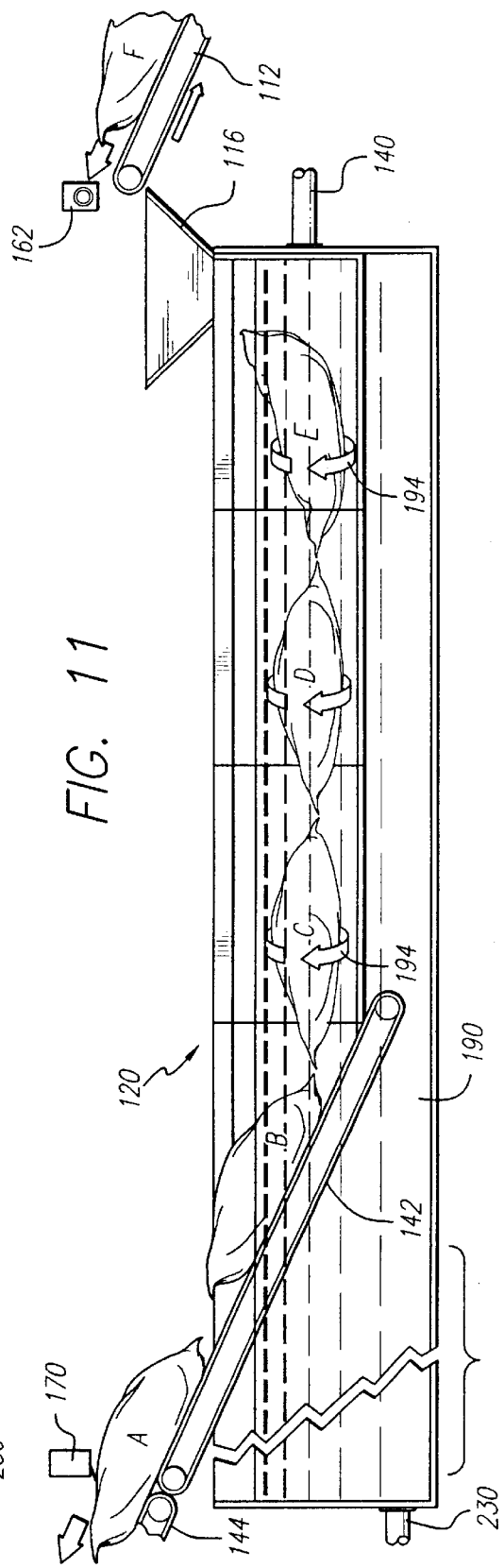

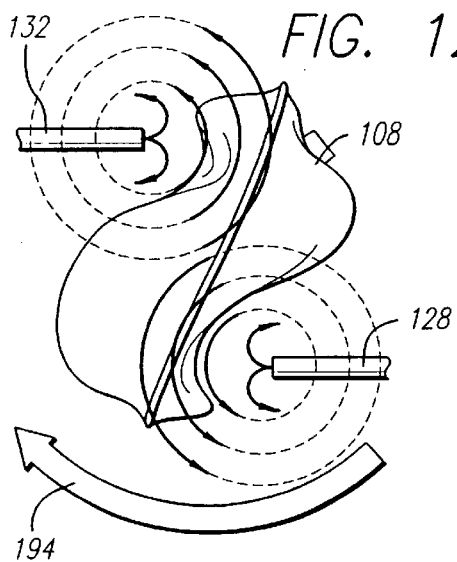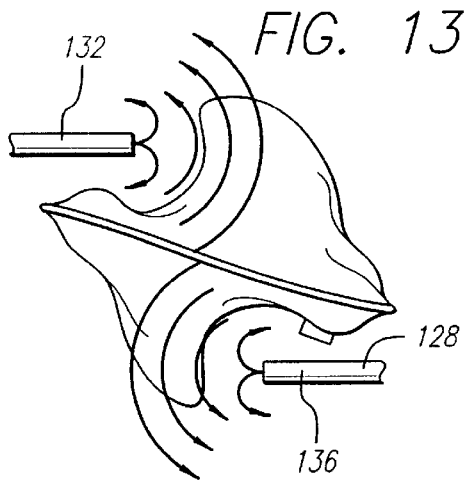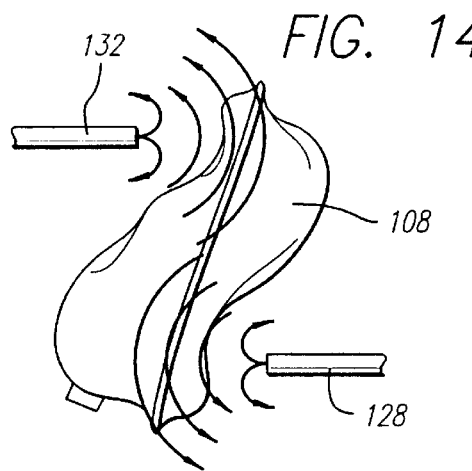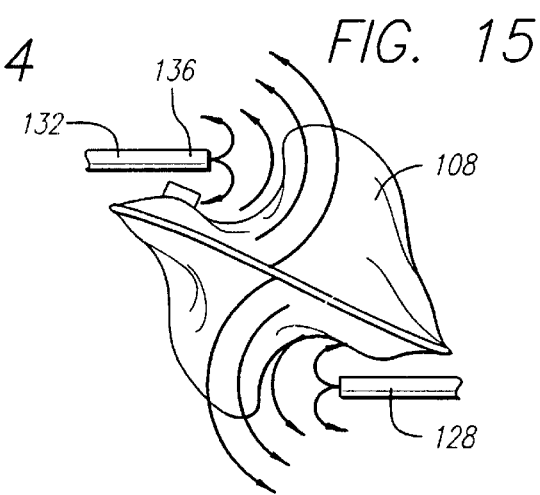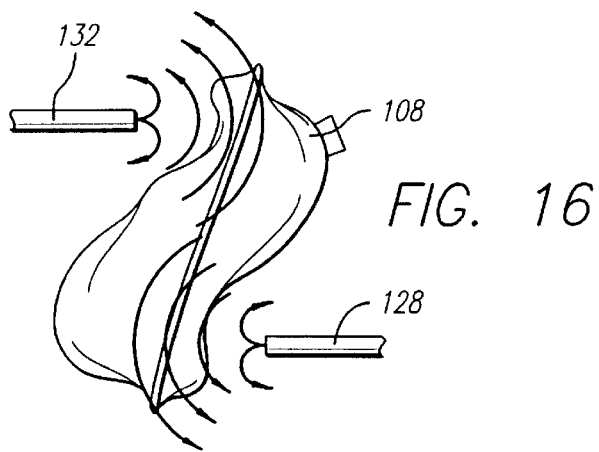

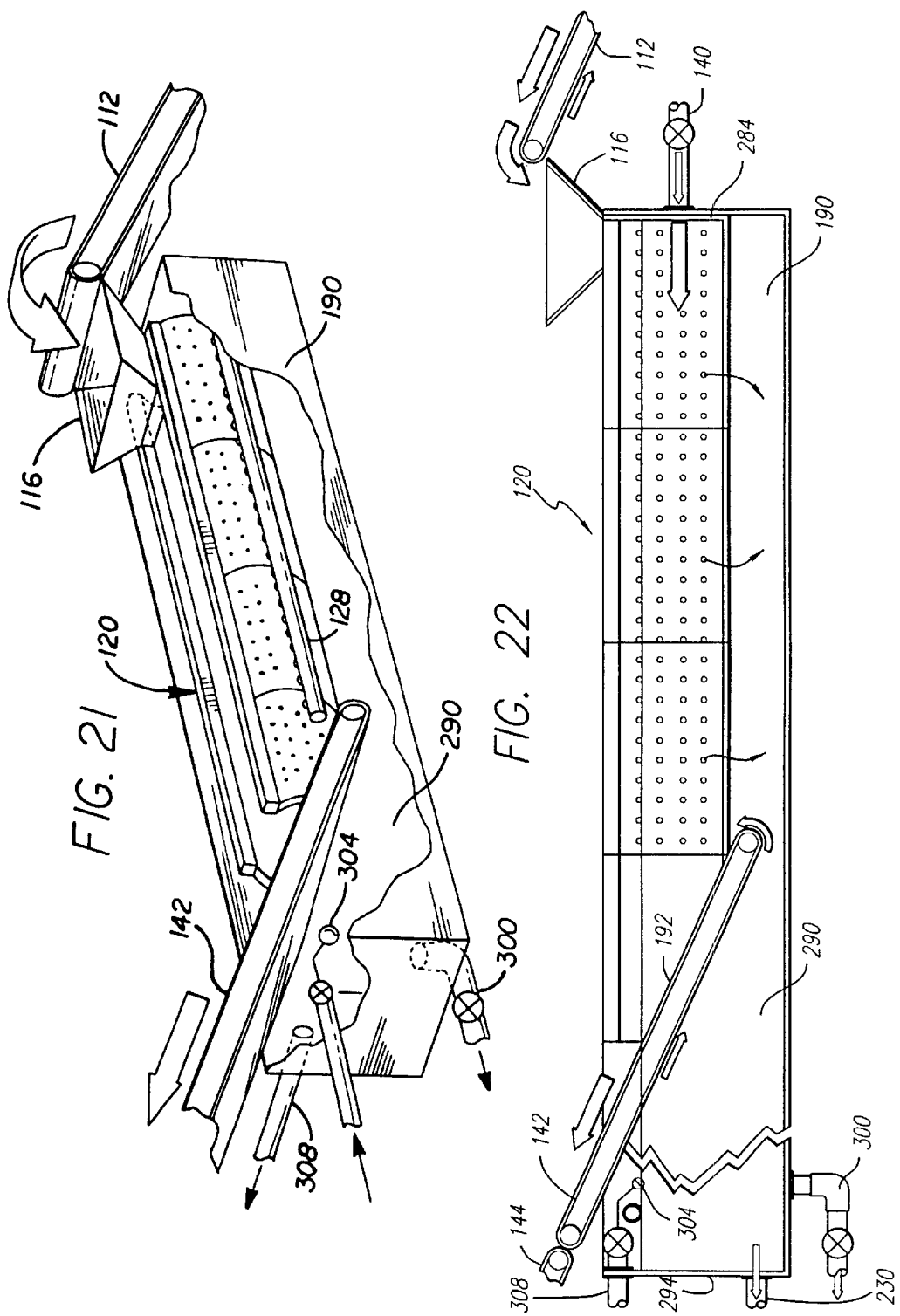

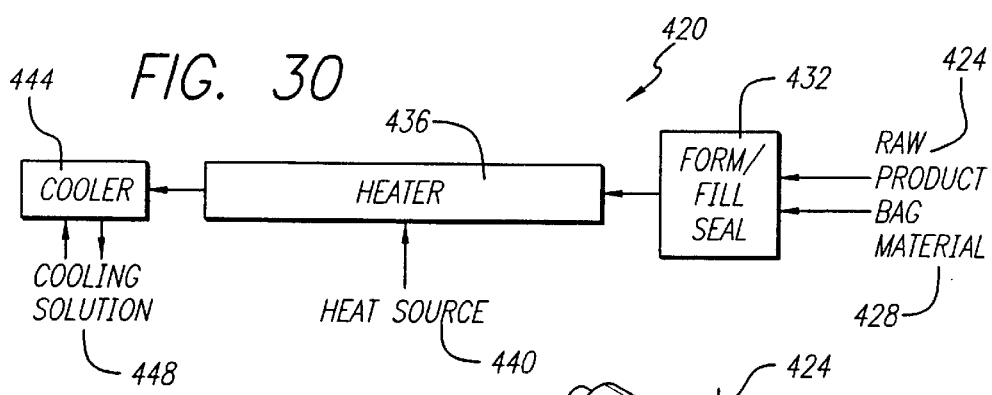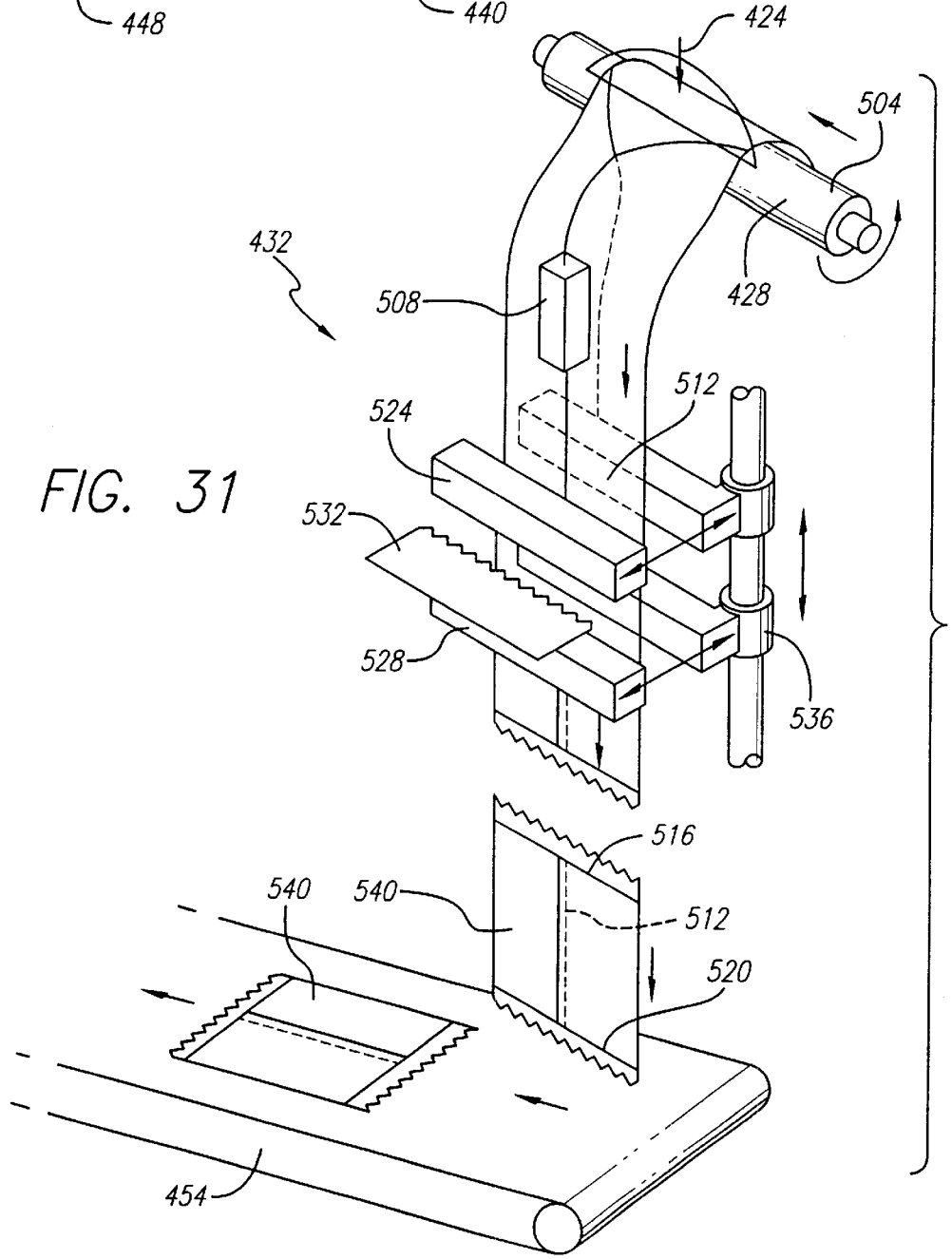

SYSTEM AND METHOD FOR HEATING AND THEN COOLING CONTENTS OF FLEXIBLE CONTAINERS

CROSS-REFERENCE TO RELATED APPLICATIONS

This application is related to the concurrently filed application Ser. No. 09/277,505, entitled Nozzle Assembly, filed Mar. 26, 1999, now U.S. Pat. No. 6,142,396; Ser. No. 09/277,004, now entitled Bleed Tube for Centrifugal Pump and Method for Retrofitting Same, filed Mar. 26, 1999, now U.S. Pat. No. 6,206,632; and Ser. No. 09/276,987, entitled System and Method for Heating or Cooling Contents of Flexible Containers, filed Mar. 26, 1999. The entire contents of each of these applications are hereby incorporated by reference.

Background of the Invention

The present invention is directed to systems and methods for heating and then cooling contents of flexible containers.

Many foodstuffs today, such as tomato paste, orange juice, crushed pineapple and diced tomatoes, are cooked and filled hot into flexible bags. The containers with the heated product (foodstuffs) must then be cooled for subsequent handling and storage.

An example of a system of the prior art for cooling contents of flexible bags is shown in FIG. 1 generally at 70. Referring thereto, the bags 72 enter the open-plastic belt conveyor 74 at one end into a first cooling station as shown generally at 76. Station 76 is shown in isolation in FIG. 2. The bag 72 is in a bath 78 of cooling water up to about its mid point. Overhead sprayers 80 spray cooling water on the tops of the bags 72. The bag 72 is conveyed by the mechanical action of the conveyor 74 to a gate 82 at the forward end of the station.

The gate 82 is formed by three stacked, upwardly rolling rollers 84, 86, 88. The actions of the conveyor 74 and the rollers 84, 86, 88 cause the bag 72 to rotate or turn over, as shown by arrow 90, about an axis generally perpendicular to the travel direction of the conveyor 74 to thereby partially mix the bag contents and to expose the bottom surface of the bag to the cooling water from the sprayers 80. The gate 82 is then pivoted down as shown by arrow 92, and the bags 72 are conveyed together to the next station for a subsequent cooling process, and so forth through the twelve or so stations.

There are a number of problems with the prior art system 70. One is that the overall process of system 70 is slow. It takes about forty minutes to cool the contents of the bag 72 from two hundred degrees down to below one hundred and twenty degrees Fahrenheit. Another problem is that the bags 72, and particularly when they are underfilled, occasionally get caught in the rollers 84, 86, 88 and break, spilling their contents. A further disadvantage of the prior art system 70 is that it occupies a large amount of floor space since it is approximately seventy feet long.

Other systems for cooling or heating the contents of flexible containers are shown in the following U.S. patents: U.S. Pat. No. 4,384,463 (Rica et al.), U.S. Pat. No. 5,009,150 (Andersen) and U.S. Pat. No. 5,370,174 (Silverstrini et al.). The contents of each of these patents and all other patents mentioned in this disclosure are hereby incorporated by reference in their entireties.

SUMMARY OF THE INVENTION

The present invention is directed to providing an efficient means for cooling (and/or heating) contents of flexible containers or bags. The bags with their hot contents are dropped into an infeed end of a trough containing cooling water. The bags are advanced from one station to the next in the trough by the periodic actuation of a fluid jet conveyor at the inlet end of the trough. After the bags are advanced to their respective next stations the fluid jet conveyor is turned off and the fluid nozzle system is turned on.

The fluid nozzle system includes a first series of nozzles on one side of the trough and directed into the trough and a second series of nozzles on the other side of the trough and similarly directed into the trough. The first series of nozzles are disposed in a horizontal plane spaced about four inches above the horizontal plane of the second series of nozzles. Thus, when the bag reaches the next station and the nozzle system is turned on, the water from about the five or so nozzles of the first series impinge against the adjacent side of the bag about two inches above the midline of the bag, and the water from the five or so nozzles of the second series impinge on the opposite side of the bag, about two inches below the midline of the bag.

The two sets of opposing and offset nozzles have two actions on the bag. First, they impinge and push in on the side of the bag, about twelve inches, for example, on each side. This "massaging" action causes the central contents of the bag to move away from the center of the bag and towards the side of the bag thereby promoting the transfer of heat from the central contents of the bag to the cooling water at the surface of the bag. Second, they cause the bags to rotate about an axis generally parallel to the axis of the trough. This rotation motion in the bath of cool water in the trough also assists in the cooling of the bag's contents. It is additionally within the scope of the invention to orient the nozzles so that the bag is rotated in a clockwise direction at one station and an opposite counterclockwise direction at a next station in the trough.

The bags generally abut one another end-to-end as they travel from station to station in the trough of the present system, and no gates or other structures separates them from the adjacent bags. The movement of the bags into, along and out of the trough is now described with respective bags in the three active stations in the trough and one in the ramped station ("dead zone") at the exit end of the trough and with the offset nozzle system on. A detector at an infeed station above the trough input end detects the arrival of a hot filled bag. When this is detected the flow of the cooling water is switched from the offset nozzle system to the fluid jet conveyor and the first extraction conveyor is turned on. The bag at the ramped station is pushed onto the first extraction conveyor and conveyed away on it. The three bags in the trough move to their respective next stations by the action of the fluid jet conveyor. A detector generally at the outlet end of the extraction conveyor detects the arrival of the extraction bag and turns the first extraction conveyor off.

The first infeed station is then empty, and the hot filled bag detected by the infeed station detector slides down into the first infeed station. Thus, bags are now in the three active stations and in the ramped station. The bag at the ramped station advantageously acts as a plug or a soft gate, blocking the further advancement of the bags relative to the trough. The infeed station detector detects that no hot filled bag is at or nearly at the infeed station, and causes the cooling water to switch and flow to the nozzle system and not the fluid jet conveyor. The three bags in the three active stations are thereby massaged and rotated. When the infeed station detector detects the arrival of another hot filled bag, the process starts again.

A centrifugal pump pumps the cooling (or heating) fluid (water) from a cooling tower to a butterfly valve which directs the fluid flow to either the fluid nozzle system or the fluid jet conveyor. A bleed tube at the exposed eye of the impeller bleeds air out of the pump. The "exposed eye" is defined when the impeller center can be seen when looking down the suction line in the direction of liquid flow. U.S. Pat. No. 4,981,413 calls it the "center of the pump impeller." (In contrast, see U.S. Pat. No. 3,575,521.) A low pressure check valve prevents air from being sucked into the pump through the bleed tube. Bleeding the pockets of air in the pump prevents the pump from losing its prime.

This pump arrangement invention, in addition to being used in the present heating/cooling environment, can be used aboard ships where the pump suction may become exposed in a rolling sea. It can be used generally in any application where the supply level is difficult to control and the pump loses its prime when air gets into the suction line.

An exemplary method for retrofitting such a pump in accordance with the present invention first disassembles the suction line from the pump. The bleed assembly is then attached to the pump. If the pump has a threaded housing, a threaded style bleeder is preferably used and screwed into place. On the other hand, if the pump has a flange face then a flanged bleeder or a threaded bleeder with a flange adapter can be used. Next, the bleeder line is extended to be as close as possible without actually touching the impeller. The suction line is then reattached (replumbing to shorten the suction line will probably be needed due to the space occupied by the bleeder). The outlet from the check valve to a drain may need to be plumbed. The bleed assembly's operation is then checked by starting the pump, introducing air into the pump so that it loses its prime, stopping air introduction and making sure the pump "burps" the air bubble through the bleeder and regains its prime.

Instead of cooling the contents of a flexible bag, it is also within the scope of the invention to heat the bag contents. More specifically, a large flexible bag is filled with unsterile product. The bag is sealed (or otherwise closed), and the (sealed) bag is loaded into a trough similar to that in the above-described cooling invention system. However, hot water is used instead of cool or cold water for both the fluid jet conveyor and the fluid nozzle system. The hot water from the nozzles impinges on opposite sides of the bag, massaging it and moving its central contents towards the surface or skin of the bag. The bag is also rotated. The heating is done quickly before the bag contents turn to mush, as would happen if the slower prior art system 70 used ambient product and hot water. Cooling can be performed, and the bags can then be boxed, providing a very economical replacement for cans. Small bags at a slow production rate can be handpacked in boxes. However, at faster rates and/or larger bags, automatic case packers, such as are currently available from FMC, Hayssen and Scholle, can be used.

Also disclosed herein is a novel nozzle assembly useful in the heating and cooling systems of this invention for heating or cooling contents of flexible containers and in other applications where a focused fluid flow is desirable as would be apparent to those skilled in the art. The nozzle assembly includes a nozzle unit, a first sleeve, a second sleeve and a clamp. The nozzle unit has an aft collar and an inner fluid contact surface. The surface tapers gradually to increase the velocity of fluid flowing therethrough about ten fold. Additionally, the elastomeric lining of the inner surface acts like an interior "skin" preventing turbulence from feeding back or building up on itself and thereby increasing the fluid power delivered by the nozzle assembly. The first sleeve has a first rear fitting, and the second sleeve has a second forward fitting. The clamp encircles the first and second fittings, holding them together with the collar sandwiched between them.

Accordingly, another way to define the present invention is that the shape and movement of the flexible bags are carefully controlled to maximize the heat transfer to the contents of the bags to quickly, efficiently and thoroughly heat or cool the contents. This is preferably done using water jets, but other means such as mechanical means including rollers, as would be apparent to those skilled in the art from this disclosure are also included herein. One way to adjust the shape and movement is to massage or otherwise manipulate the bags to move the central contents of the products therein towards the bag surface or skin. This can be done by opposing but offset forces on the bag. The action of the massaging (or offset forces) can also be done with a force on the bags causing them to rotate, preferably in a bath of heating or cooling fluid.

A further definition of the invention is the use of the heating or cooling fluid (e.g., liquid and specifically water) as the heat transfer medium for heating or cooling the contents of the flexible containers and also as the means for changing the shape and/or movement of the flexible containers to improve the heat transfer to their contents. The fluid thereby serves two functions. The fluid additionally can serve as the motive force (a third function) for moving the containers from one work station to the next.

The invention can thus be used to heat and/or cool contents of flexible containers. One embodiment fills the bags with hot product, closes the bags and then cools them pursuant to this invention. Another embodiment fills the bags with product at a cold or ambient temperature, closes the bags and then heats them pursuant to this invention. And a preferred way to close them is to seal them shut. The bags with heated product can then be cooled using a system of this invention. Alternatively, they can be cooled by other means as would be apparent to those skilled in the art.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a perspective view of a prior art system for cooling contents of flexible bags, with portions of the system broken away for illustrative purposes;

FIG. 2 is a side elevational view of a station of the prior art system of FIG. 1;

FIG. 8 is a cross-sectional, side elevational view of the trough of the system of FIG. 3 showing a first step in the cooling process of the present invention;

FIG. 9 is a view similar to FIG. 8, showing a second step;

FIG. 10 is a view similar to FIG. 8, showing a third step;

FIG. 11 is a view similar to FIG. 8, showing a fourth step;

FIG. 12 is an enlarged view of one of bags C, D or E of FIG. 11 depicted in isolation for illustrative purposes and showing a first massaging and cooling (or heating) step of the present invention;

FIGS. 13, 14, 15, and 16 are views similar to FIG. 12 and illustrating subsequent massaging and cooling (or heating) steps on the bag through a rotation of the bag;

FIG. 21 is a front perspective view of the trough of the system of FIG. 3 illustrating the fluid flow system;

FIG. 22 is a side elevational cross-sectional view of the trough of FIG. 21;

FIG. 30 is a block diagram of a system of the present invention for heating and subsequently cooling product in sealed flexible containers;

FIG. 31 is a simplified perspective view of a system of the invention of FIG. 30 for forming the flexible containers, filling the containers with product and sealing the filled containers for discharge onto a conveyor;

DETAILED DESCRIPTION OF PREFERRED EMBODIMENTS OF THE INVENTION

Figure 3:
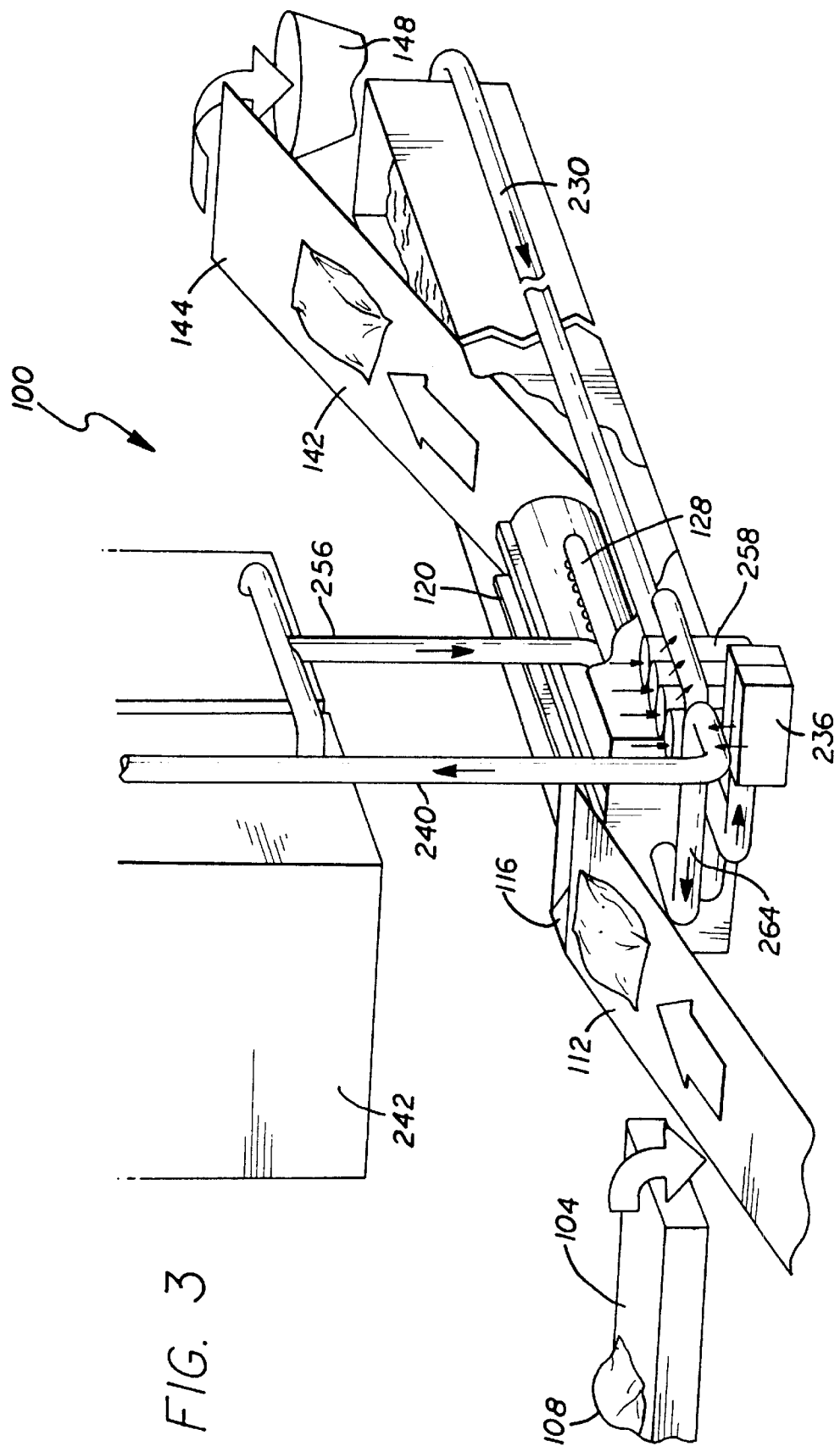
FIG. 3 is a rear perspective view of a system of the present invention for cooling (or heating) contents of flexible bags.

A system of the present invention for heating or cooling flexible containers or bags is illustrated in the drawings at FIGS. 3–7 generally at 100. Referring thereto the bags are filled with the hot product at the fill table depicted generally at 104. The filled bags 108 are dropped one by one onto an infeed conveyor 112 where they are slowly conveyed to an infeed slide 116. They drop from the infeed slide 116 into a horizontal cooling (or heating) trough 120. Briefly, in the cooling trough 120, the bags 108 are acted upon by two fluid systems. The first is a nozzle system shown generally at 124, which includes two manifolds or pipes 128 and 132, each on an opposite side of the cooling trough 120 and each having a series of spaced nozzles 136 along its length. (The construction of the nozzles 136 is shown in greater detail in FIGS. 26–28.) Although the pipes 128 and 132 are both horizontal and their nozzles 136 are horizontally disposed, the pipes are positioned in different horizontal planes, that is, offset vertically from one another.

The other fluid system is a fluid jet conveyor 140 at the inlet end of the cooling trough 120 and which conveys the filled bags 108 to the outlet end of the trough. At the outlet end, the cooled bags 108 are picked up by a first discharge conveyor 142. The first discharge conveyor 142 conveys the bags 108 to a second discharge conveyor 144, which in turn conveys them to its bag drop end where they drop into a fifty-five gallon drum 148. An air drying area is positioned at adjacent ends of first and second discharge conveyors 142, 144. An air blower motor 149 (FIG. 25) supplies about two psi air at high volumes to air knives that blow the water off of the bags 108 in this air drying area. The motor 149 can be a ten horsepower regenerative type blower. An optional (photoeye) detector 150 (FIG. 24) for bag drop safety and accumulation can be provided at the top of the second discharge conveyor 144.

The travel time of fifty-five gallon bags 108 in system 100 is thirteen to fifteen minutes (eight minutes hold, plus five minutes cooling, plus one minute conveying) from the fill table 104 to the fifty-five gallon drum 148. The time variation is caused by the accumulation of bags on the discharge conveyors 142, 144. The time from the infeed slide 116 to the discharge conveyor 142 is only five to seven minutes.

Figure 24:
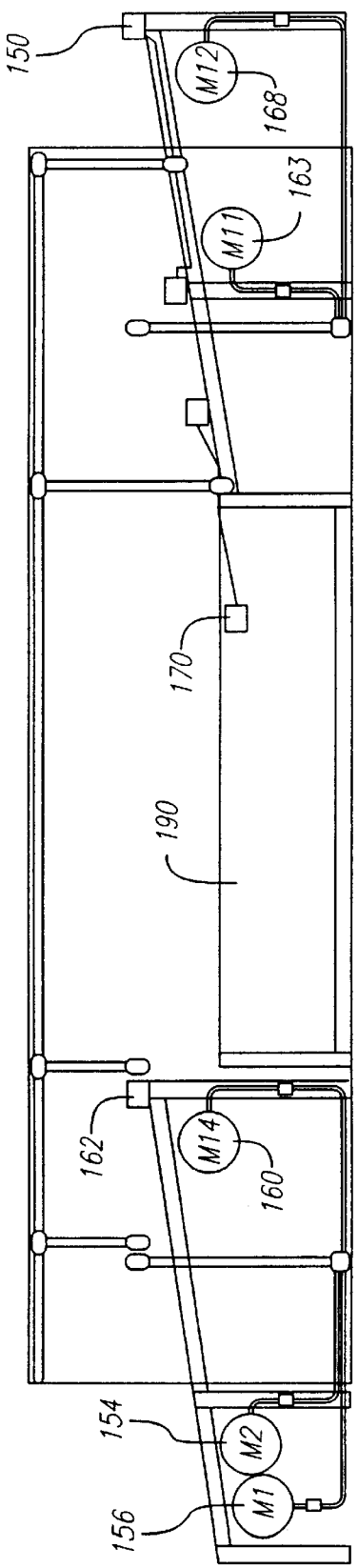
FIG. 24 is a side elevational view of the motor/pump arrangement of the system of FIG. 3, inside the cargo container.

The fill table 104 is a short conveyor having a motor 154 mounted on weigh cells with a robotic decapper/filler/recapper positioned above, as is known in the prior art. Fill table 104 includes a motor 156 as depicted in FIG. 24. The operator places a bag into the device, the cap is automatically removed from the bag and the fill spout is inserted. The fill sequence continues until the correct weight of product has entered the bag. At that time, the filling is stopped, the spout removed, and the bag is recapped and released. A lighted button advises the operator that the bag 108 is ready to be advanced to the infeed or hold conveyor 112. The operator pushes a button causing a short conveyor to roll the bag 108 face down onto the hold conveyor 112. The face down/fitment down orientation causes the fitment to heat to a sterilization temperature as it travels slowly up the conveyor 112.

When a hot filled bag (E) slowly arrives at the top of the conveyor 112 (which is driven by motor 160), as shown in FIG. 8, the following sequence is initiated. The arrival is detected by a detector 162, which through a computer 164 (FIG. 23) causes the flow of the cooling fluid (cold water) to be switched by a butterfly bypass valve 165 from the nozzle system 124 to the fluid jet conveyor 140 (the eye at the infeed end of the cooling trough 120), which has a pressure between twenty and thirty psi. The detector 162 preferably is a photoeye detector, but it alternatively can be a capacitance probe, a proximity switch, a retroreflective photoeye, a whisker switch, an ultrasonic sensor, a microswitch with rollers, a load cell underneath the conveyor to detect weight strain, a sensor which senses current changes in the conveyor drive motor or any other detector as would be apparent to those skilled in the art. The detector 162 also causes the motor 163 of the first discharge conveyor 142 (the extraction conveyor) to be turned on. The combination of the water flow induced by the fluid jet conveyor 140 and the travel of the first discharge conveyor 142 pushes the end bag (A) in the dead station 166, as shown in FIG. 8, onto the first discharge conveyor and then onto the second discharge conveyor 144, which is driven by a motor 168 (FIG. 24).

A detector 170 associated with the first (or second discharge) conveyor 142 (or 144) senses that a bag has been extracted and instructs the computer 164 to turn off the motor 163 of the discharge conveyor 140. The detector 170 is preferably a whisker switch, but it can be any of the other detectors listed above with respect to detector 162. With one bag (A) out of the cooling trough 120, the three remaining bags (B, C, D) advance four feet to their respective next stations, as shown in FIG. 9. This four foot advancement makes room at the infeed station 184 of the trough 120 for the incoming bag (E).

The incoming bag (E) is moving so slowly on the infeed conveyor 112 that there is time for the process described above to empty infeed station 184 before the incoming bag slides off of the infeed conveyor, down the slide 116 and into the infeed station. As the bag (E) slides into the infeed station 184, the flow from the fluid jet conveyor 140 keeps the bags (B, C, D) moving towards the outlet end of the cooling trough 120. The bags 108 are prevented from tumbling end over end by the narrow trough diameter, which is important because the customers want the fill spout to be at the top of the drum 152. In other words, the fill spouts on the bags need to be on the downhill end as they arrive at the infeed hold conveyor for proper sterilization.

When the tail of the bag (E) clears the detector 162, the computer 164 causes bypass valve 165 to reverse the bypass state and send pressure back to the nozzle system 124. Referring to FIG. 11, the cooling trough 120 has bags (B, C, D, E) in each of the four stations. The bag (B) in the dead station 166 advantageously acts as a soft plug (resembling a beached whale), blocking forward movement of the three bags (C, D, E) in the three active stations. That is, the three bags (C, D, E) are end-to-end in the narrow trough 120, preventing bags from leapfrogging over one another, which would result in inconsistent and ineffective cooling of the bag contents. The nozzles 136 of the pipes 128 and 132 do not extend into the dead station 166.

The cooling trough 120 is perforated to allow the escape of the cooling fluid in the trough into the sump 190 therebelow. The sump 190 is a three foot deep, large rectangular stainless steel vessel. The last four feet of the cooling trough 120 at the dead station 166 are not perforated. Additionally, the bottom of the cooling trough 120 at the dead station 166 is cut away diagonally upward at end 192 so that the discharge or extraction conveyor 142 can efficiently pick up the bag in the dead station 166 and carry it out of the cooling trough 120. Extraction conveyor 142 has a slope of approximately twelve degrees, since a larger slope greater than approximately sixteen degrees would result in the bag breaking the static friction of the conveyor and sliding back down into the trough 120. Thus, the dead station 166 is important because it allows a bag which has been cooled to act as a plug or soft gate holding the other three bags in the three active stations behind it. This importantly provides a gentle transition and stop for the bags in the cooling trough 120. of course, more or fewer than three active stations can be provided as needs require.

Since the pipes 128 and 132 of the nozzle system 124 are offset, the action of the fluid from the nozzles 136 on the soft flexible bags 108 has two actions, as depicted in FIGS. 12–16. First, the action of the water impinges on both sides of the bags pushing their flexible sides in. This causes the hot contents at the center of the bag 108 to be moved outward towards the skin of the bag where they can be cooled more quickly by the cool water bath of the cooling trough 120. In other words, the nozzle system 124 causes a massaging action on the bags 108, moving hot contents in the middles of the bags towards the flexible skins of the bags to promote quicker cooling thereby solving the prior art problem of cooling the last to cool central contents.

The water from the nozzles or jets 136 should push the bag 108 surfaces in as far as possible. Although the preferred fluid of the system 100 is water, other liquids such as brine and oil can be used as would be apparent to those skilled in the art. The greater or deeper the dimpling of the bags 108, the greater the internal circulation of the bag contents. The surface can be pushed in as far as the radius of the free floating bag for fifty-five gallon and five gallon bags 108. The depth of the dimple depends upon the force delivered to the bag, the slack of the bag around the product, the viscosity of the product in the bag and the speed of rotation of the bag. An example for a fifty-five gallon bag 108 is a dimple of approximately twelve inches. Another description of the depth of the dimple or indent is approximately forty percent of the free floating diameter of the bag 108.

The second action of the nozzle system 124 on the bags 108 is a rotating action, which can be understood from FIGS. 12–16, by arrow 194. The rotation is about an axis of the bags 108 which is parallel to the longitudinal axis of the cooling trough 120, or in other words, parallel to the travel path of the bags caused by the periodic actuation of the fluid jet conveyor 140. The rotation circulates the bag 108 within the surrounding cooling water in the trough 120 thereby promoting efficient cooling, in addition to assisting in the massaging action. The bags 108 can be rotated at one-half revolution per second or thirty revolutions per minute. Thus, for an actuation period of under two minutes, this means about fifty rotations at each of the three active stations. The three stations are based on diced Chile peppers cooling in five minutes at a rate of one bag every two minutes, pursuant to this invention.

The number of stations and the time at each station are selected for the desired product and to provide enough cooling to take enough heat to prevent product degradation but no more cooling than necessary. A range of workable rotations for typical products is between twenty and thirty-five rotations per minute with a preferred rate being thirty rotations a minute, which cools faster than twenty rotations a minute. The time spent by the bags 108 at each station is determined by the frequency of bag arrivals at the infeed station 184. For example, the system 100 can be designed for 1.5 minutes dwell per station, and used initially at three minutes per station and then later ramp up to the 1.5 minutes per station frequency.

FIGS. 12–16 show a preferred arrangement wherein the nozzles 136 on opposite sides of the bag 108 are parallel to each other. This provides the best turning or rotating of the bags. Other arrangements are also within the scope of the invention, however. For example, a fifteen degree offset has been shown to provide an effective cooling but occasional slowing of the bag rotation occurred. Alternative nozzle orientations are illustrated in FIGS. 17a–17d. The top view arrangement 200 of FIG. 17a likely would provide good product mixing and thus cooling (or heating). Arrangement 204 of FIG. 17b works, although it suffers from reduced bag rotation. Arrangement 208 of FIG. 17c massages the bag contents but does not effectively rotate the bag. More than two nozzles can work as illustrated by arrangement 212 of FIG. 17d. While the nozzles of arrangement 212 should be symmetrical, they should preferably not be directed straight in but rather at an angle (e.g., fifteen degrees) off center to impart a torque on the bags (108).

Figure 29A:
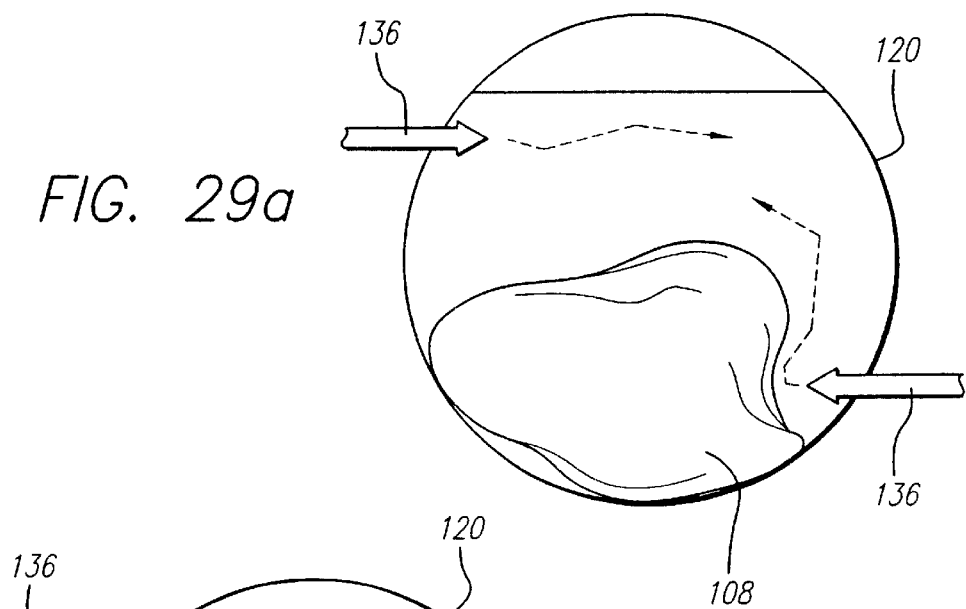
FIGS. 29a, 29b and 29c are simplified cross-sectional views through the trough of the system of FIG. 3, showing the relationships of various ratios of flexible container diameters to trough diameters.
Figure 29B:
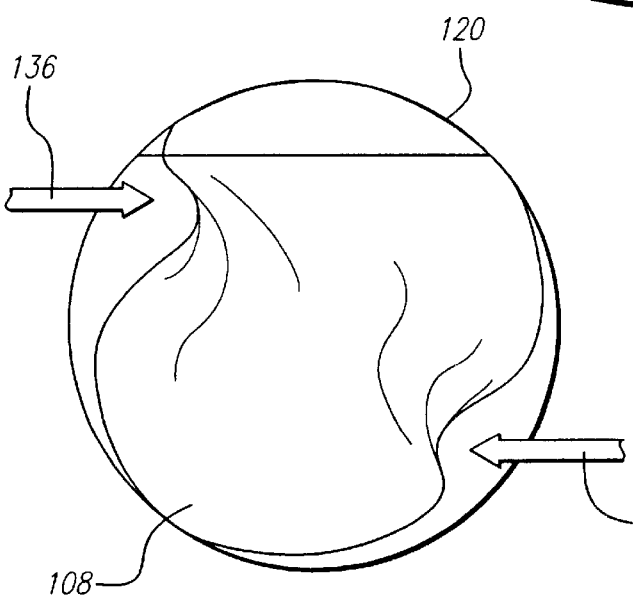

The containment vessel or trough 120 fits around the bags 108 to prevent them from moving out away from the nozzles or jets 136. The nozzles 136 work well in the range of one third to two thirds of the radius of the trough offset from the horizontal centerline. Less than one third radius makes bag rotation unsure. And larger than a two third offset creates little dimpling of the bag and therefore low circulation of the product in the bag. The best internal circulation is created by a combination of bag rotation and impingement. A preferred ratio of the diameter of the bag (108) to the diameter of the trough (120) 0.9 and a workable range is 0.8 to 0.95. (See FIG. 29a) Too much slack (as shown by arrangement 200 in FIG. 29a) allows the bag to "hide" in the trough from the jets or nozzles 136 and not turn. As depicted in FIG. 29b, too little slack results in the bag 108 dragging against the wall of the trough 120 and not turning.

Figure 29C:
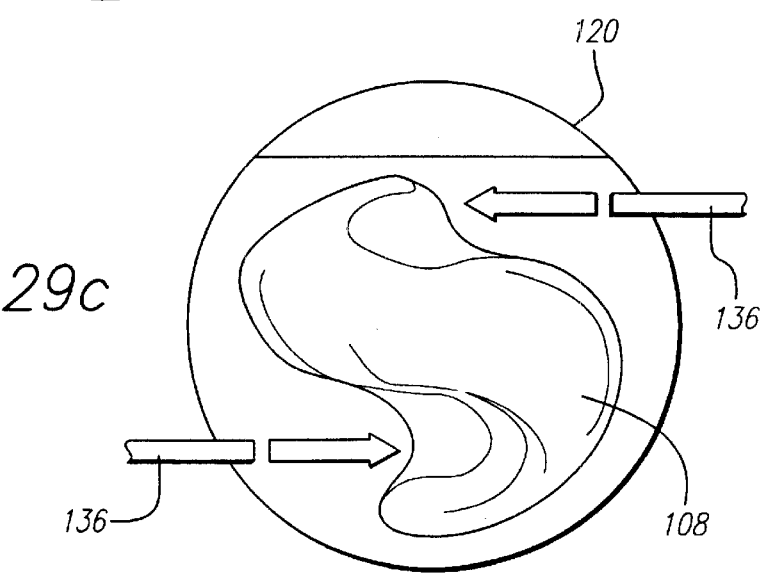

The above-mentioned preferred ratio and range are affected by the percentage "fill" of the bags (108). The bag diameters discussed above are the "free floating" diameters and on a typical fill of sixty percent of their ultimate burst volume. Sixty percent fill allows for a lot of slack which makes the bag supple when free floating and allows the massaging action of the nozzle system 124 to work effectively. Referring to the arrangement 204 of FIG. 29c, a fifty-five gallon bag 108 has a (flat) width of thirty-seven inches or a 23.56 inch diameter working in a twenty-six inch diameter vessel of cooling trough 120. By knowing the above-discussed ratio, designers can design vessels (120) for any size of bag.

Preferred bags which can be used with system 100 are today's fifty-five gallon bags constructed of two polyethylene layers covered by a layer of polyester or nylon, five gallon bags comprising two polyethylene layers, three gallon single-ply bags, and one gallon bags. In other words, the bags can be made of plural layers with most of the layers made of polyethylene, and the outer layer can also be made of nylon for added strength. A filled bag has a bottom flattened elliptical cross-section. A fifty-five gallon bag is approximately seven inches thick, thirty-four inches wide and fifty-five inches long. Those dimensions are maximum because the surface is constantly curving, attempting to form a sphere. A five gallon bag is approximately a one-eleventh scale model of a fifty-five gallon bag.

The product which is to be cooled (or heated) pursuant to this invention is generally any semi-fluid product which can be placed in these flexible bag containers. The lower the viscosity of the product the better the heat transfer. Most foodstuffs (including tomatoes, peppers and peaches) can be used. The product can also be non-foodstuffs, such as blood plasma, corrosive chemicals and reactants for chemical reactions to produce a finished product. High viscosity or thick products, such as Karo syrup, need considerable power to massage the bag, requiring high nozzle pressures.

Nozzle pressures from thirty to one hundred and twenty psi work well with system 100. Although the pressure can go higher than one hundred and twenty psi to three hundred or four hundred psi, pressures generally greater than four hundred and fifty psi would have enough energy to cut or otherwise damage typical bags. The force delivered to the bags depends on the distance of the tip of the nozzle 136 to the surface of the bag 108, which has a practical limit of about one inch without damaging the bags.

In one preferred system, fifteen nozzles 136 are provided on each side of the twelve foot active portion of the trough 120. The nozzles 136 can be spaced every eight inches. Tests using twelve inch spacing for fifty-five gallon bags, three inch spacing on fifty-five gallon bags, and four inches for five gallon bags have been successfully tested. It is also within the scope of the invention to arrange the nozzles 136 so that the direction of rotation of the bag 108 caused by the action of the nozzles 136 is changed from active station to station.

Figure 4:
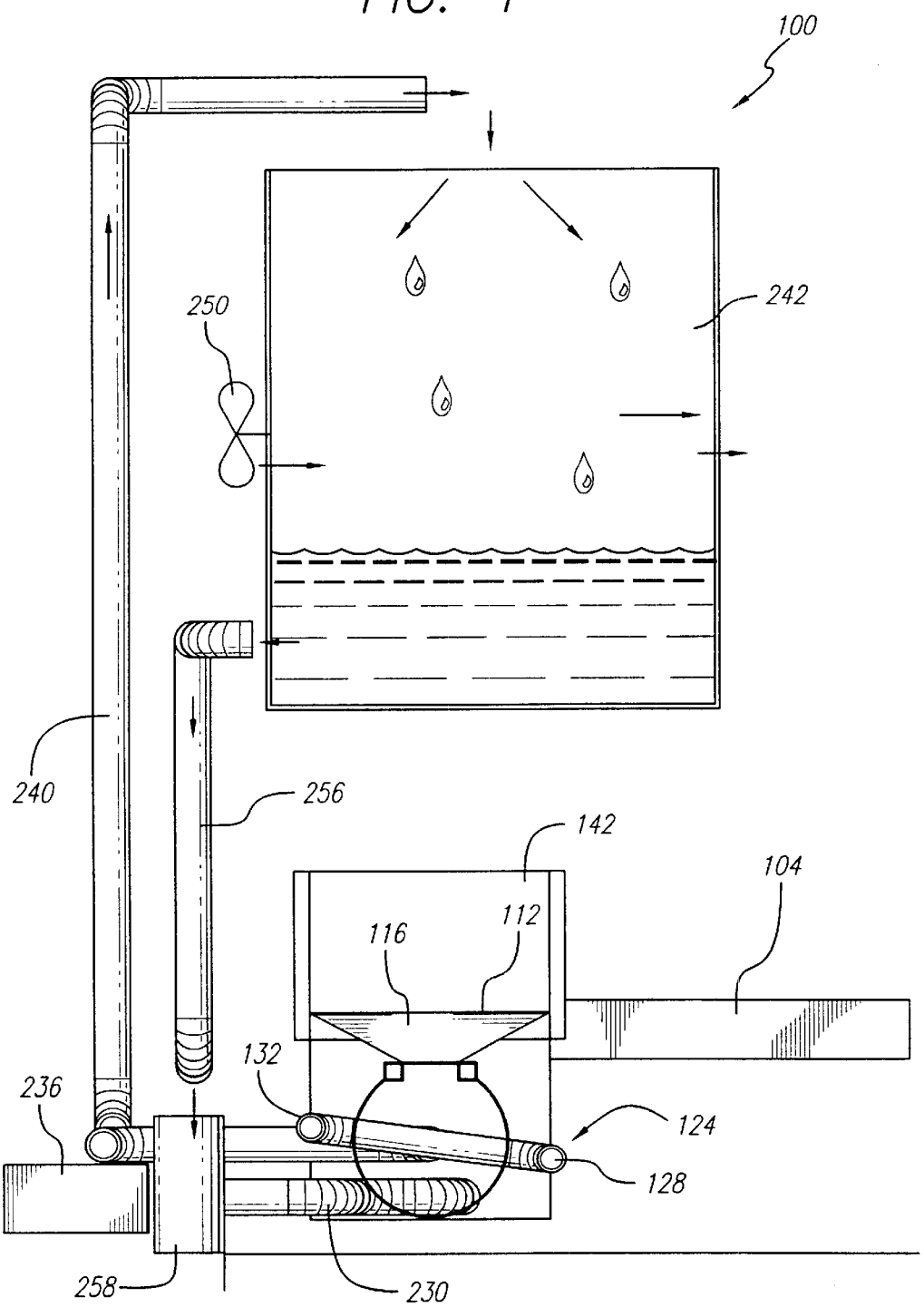
FIG. 4 is an end view of the system of FIG. 3.
Figure 5:
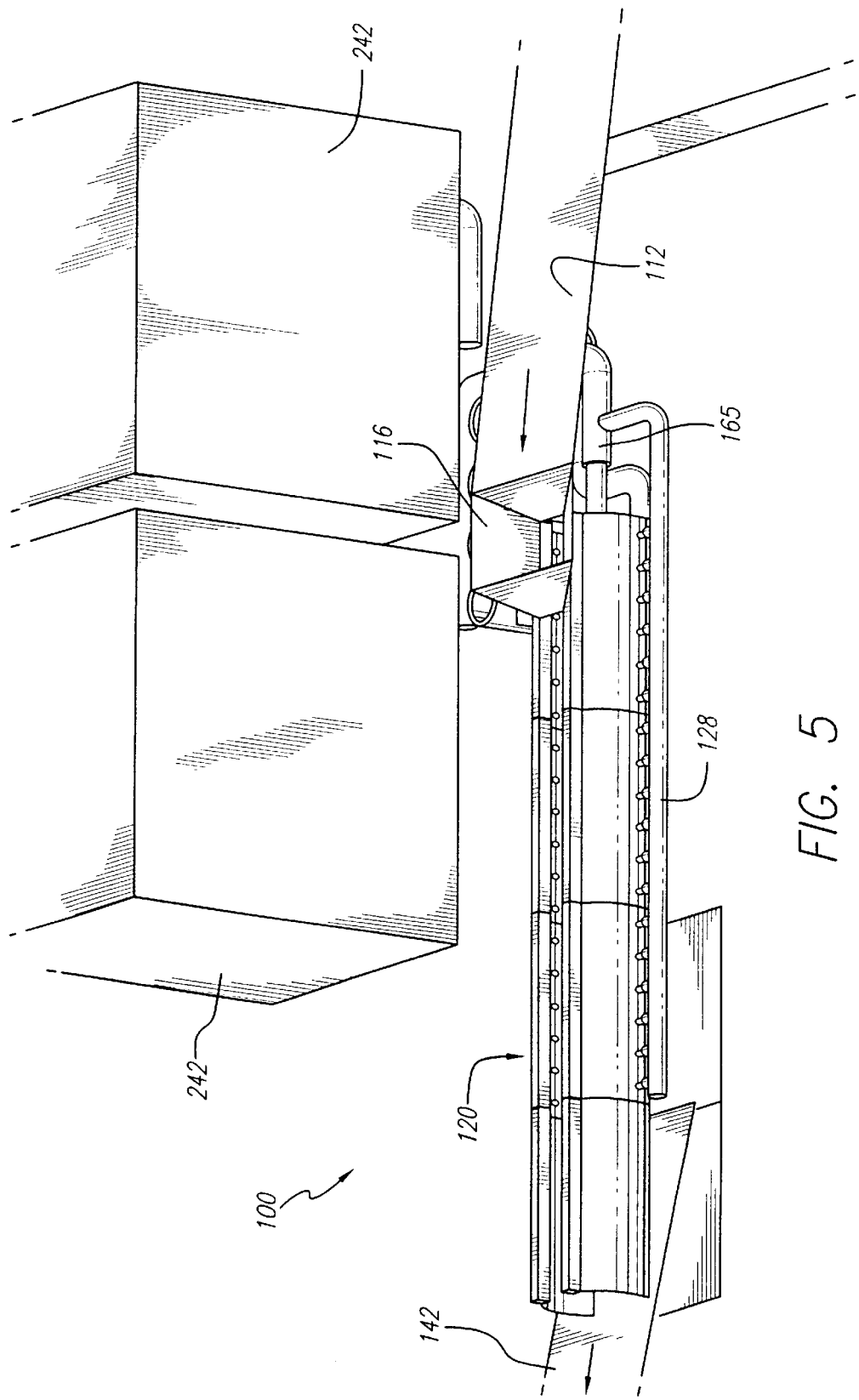
FIG. 5 is a side perspective view of the system.
Figure 6:
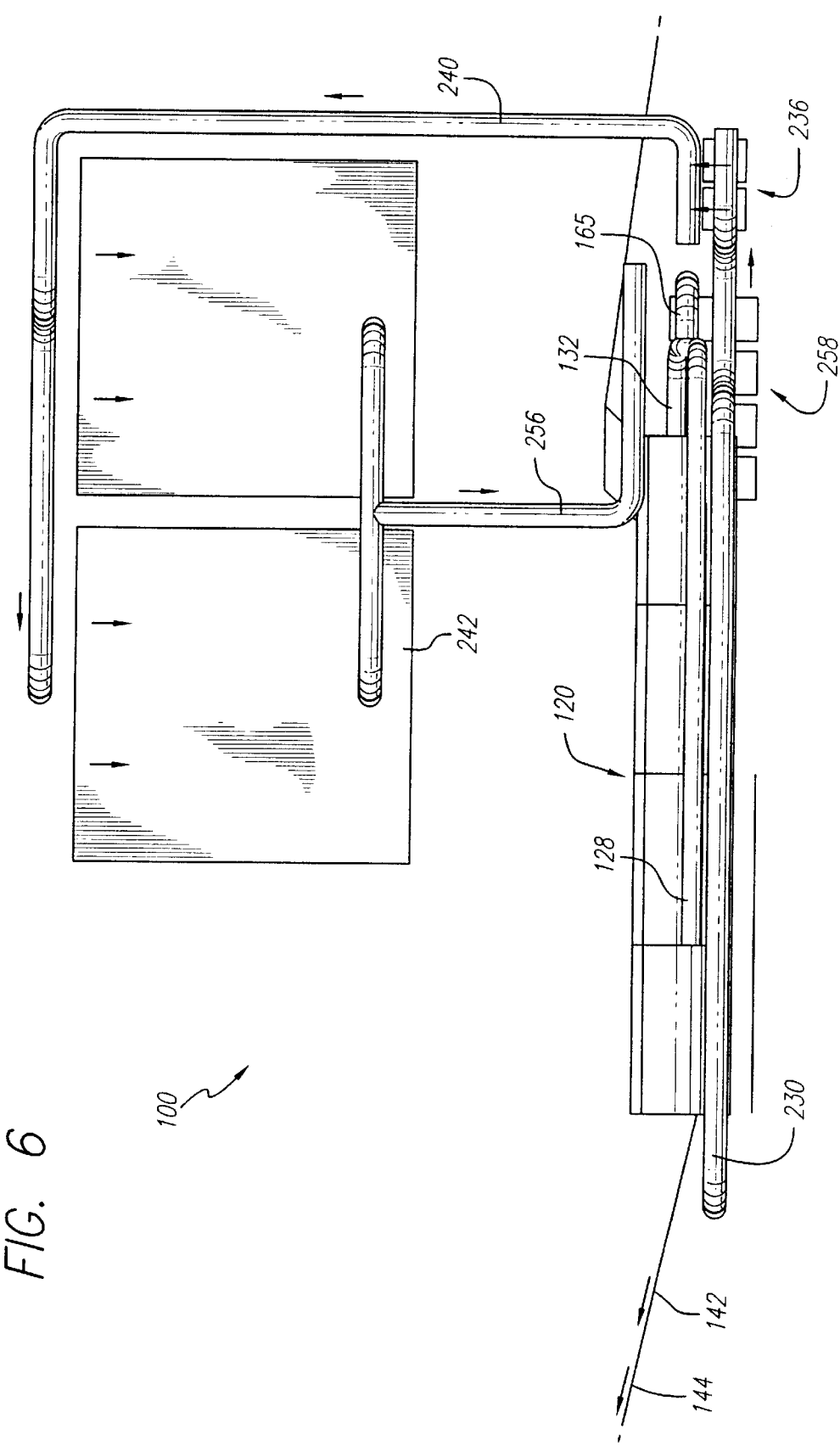
FIG. 6 is a side elevational view of the system.
Figure 7:
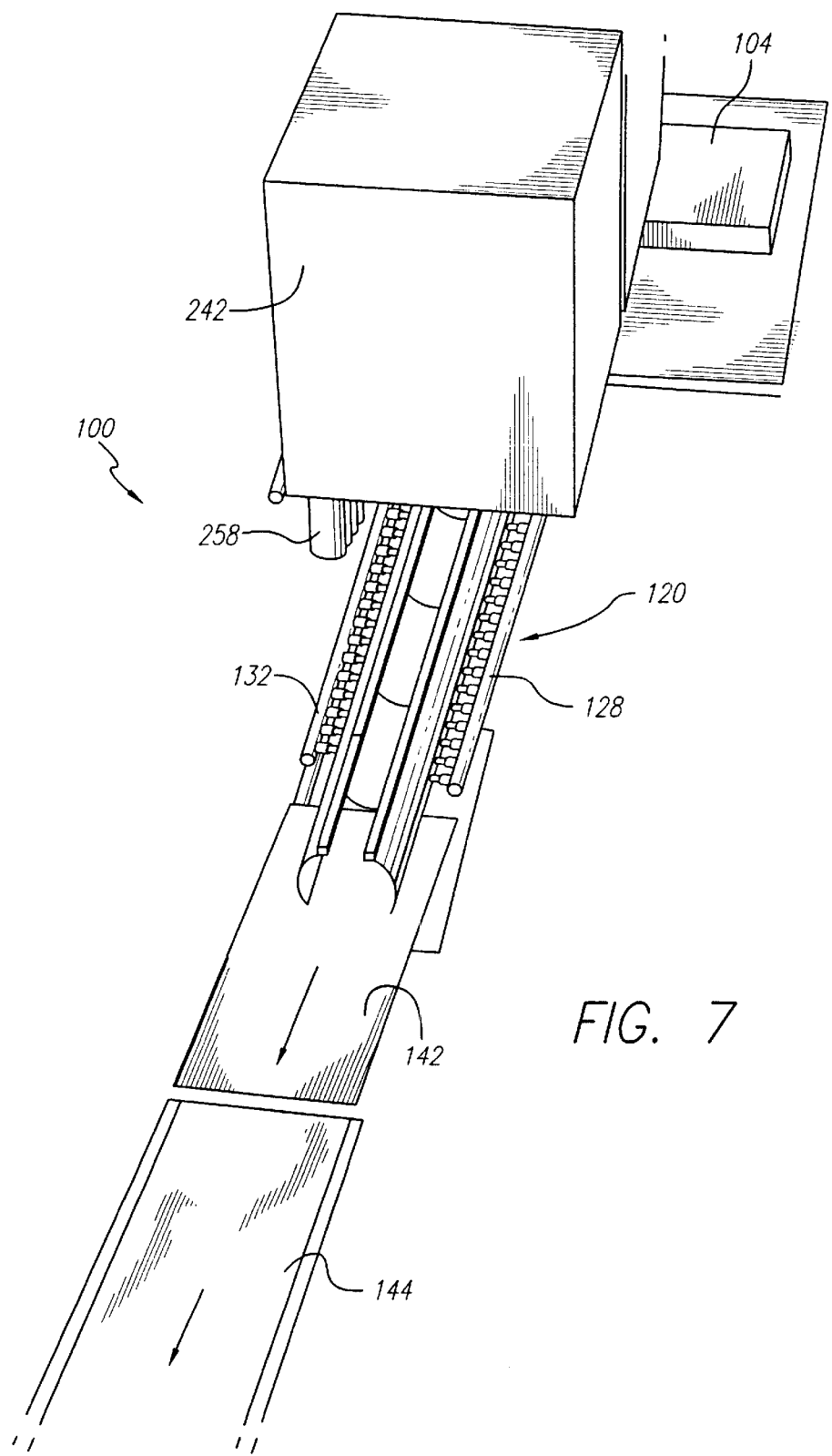
FIG. 7 is a front perspective view of the system.
Figure 17A:
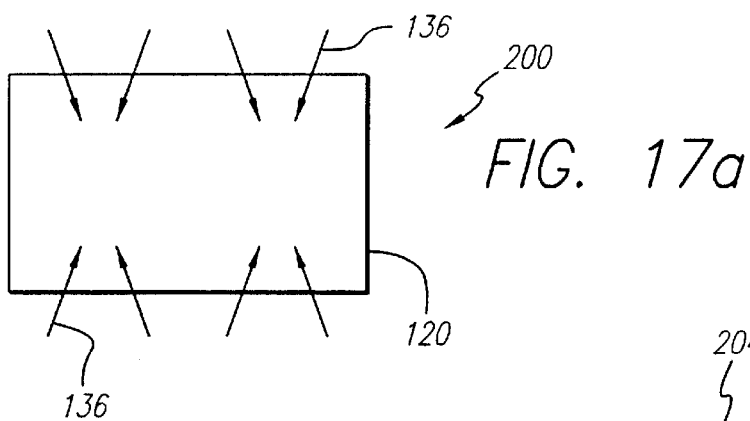
FIGS. 17a, 17b, 17c and 17d illustrate diagrammatically various alternative fluid jet nozzle arrangements relative to the flexible bag.
Figure 17B:
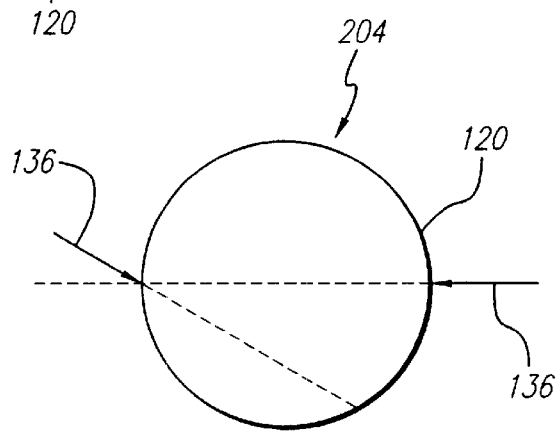
Figure 17C:
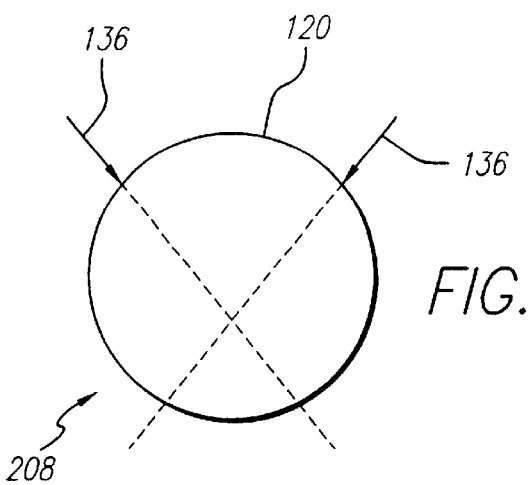
Figure 17D:
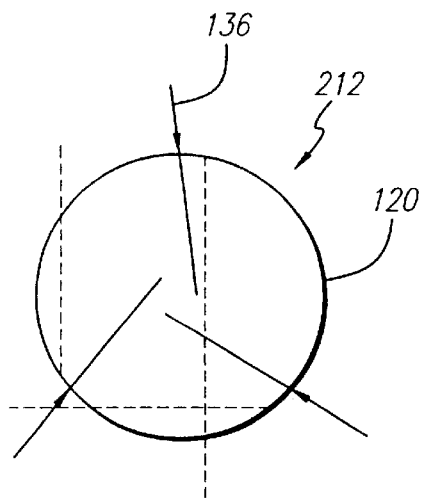
Figure 25:
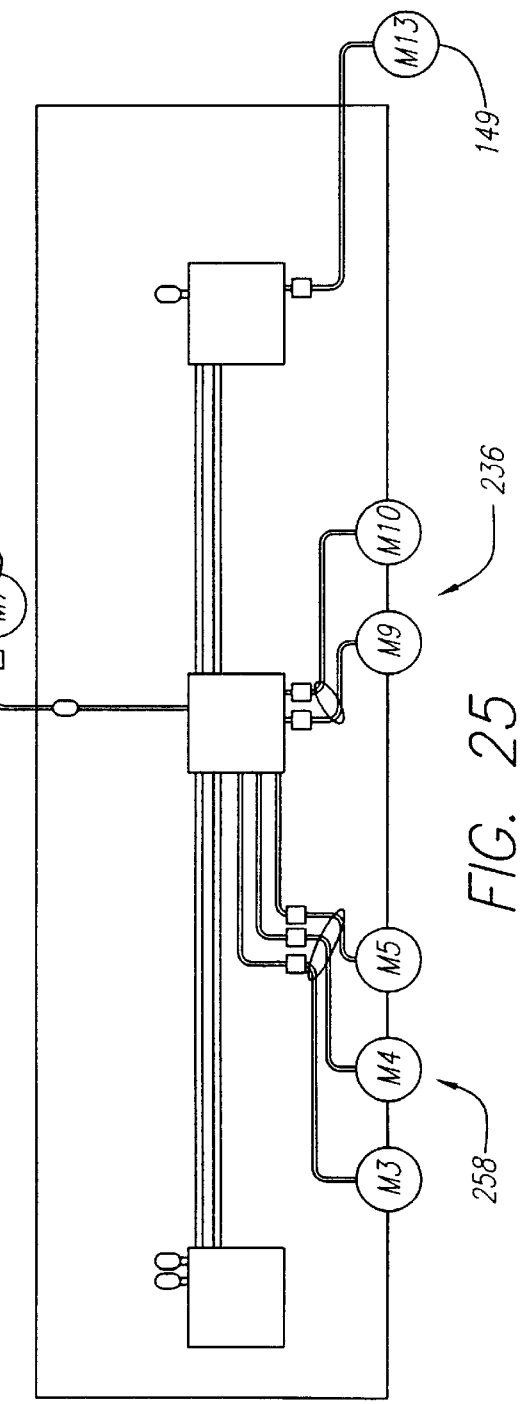
FIG. 25 is a top view of the motor/pump arrangement of the system, outside the cargo container.

Thus, the cooling water (or other cooling fluid) leaves the nozzles 136 and impinges on the bags 108. It then escapes through the perforations in the cooling trough 120 and into the surrounding sump 190. The water flows to the discharge end of the sump 190 and into the (Schedule forty PVC) end (or alternatively, side) suction line 230. From the suction line 230 the water flows to two (Teel brand) circulating sump pumps 236, which pump the water up pipes 240 to the (two) Marley cooling tower 242. Evaporative cooling occurs in tower 242 by the distribution of the water at the inlet from where it falls through the stream of cooling air from a fan 250 (FIGS. 4 and 25). The water is cooled in the tower 242 to a wet bulb temperature of approximately seventy degrees Fahrenheit. The water has been heated approximately four to ten degrees in the system before it enters the cooling tower 242. (See, e.g. FIG. 6.) The amount of temperature rise is very dependent upon the nozzle flow rates and level of the fluid in the trough 120.

The cooled water from the tower 242 flows in pipes 256 into the suction of three (blue Goulds high head) pressure pumps 258. Pumps 258 pump the water through (gray six-inch Schedule-eighty PVC) pipe 264 to the manifold under the infeed conveyor 112. Normal flow in that manifold is split into two (four-inch gray Schedule-eighty PVC) manifolds or pipes 128 and 132 that house the pressure nozzles 136.

As discussed earlier, the (six inch) butterfly valve 166 is triggered by the (photoeye) detector 162 and when opened provides a low resistance path for the water from the high head pumps 258. This essentially shuts off the nozzles 136 and creates a flow down the center of the containment vessel or cooling trough 120 by the fluid jet conveyor 140. This flow forces the bags 108 in the trough 120 to advance to their respective next stations and makes room at infeed station 184 for the incoming hot filled bag 108 from the infeed conveyor 112.

Thus, the pressure pumps 258 provide water to alternating loads, namely the cooling jet conveyor 140 and the nozzle system 124. When the system changes between the two loads, the resistance to flow changes. This resistance combined with the occasional influx of air into the suction manifold system from the cooling tower 242 causes gulps of air to enter the pressure pumps 258. The pockets of air cause the pumps 258 to lose their prime. Operator intervention is then required to bleed the air to get the pumps 258 working again. The present invention solves this problem. The pump system as described below has applications in other types of systems where when a prime is lost shut down is not a practical option.

Figure 18:
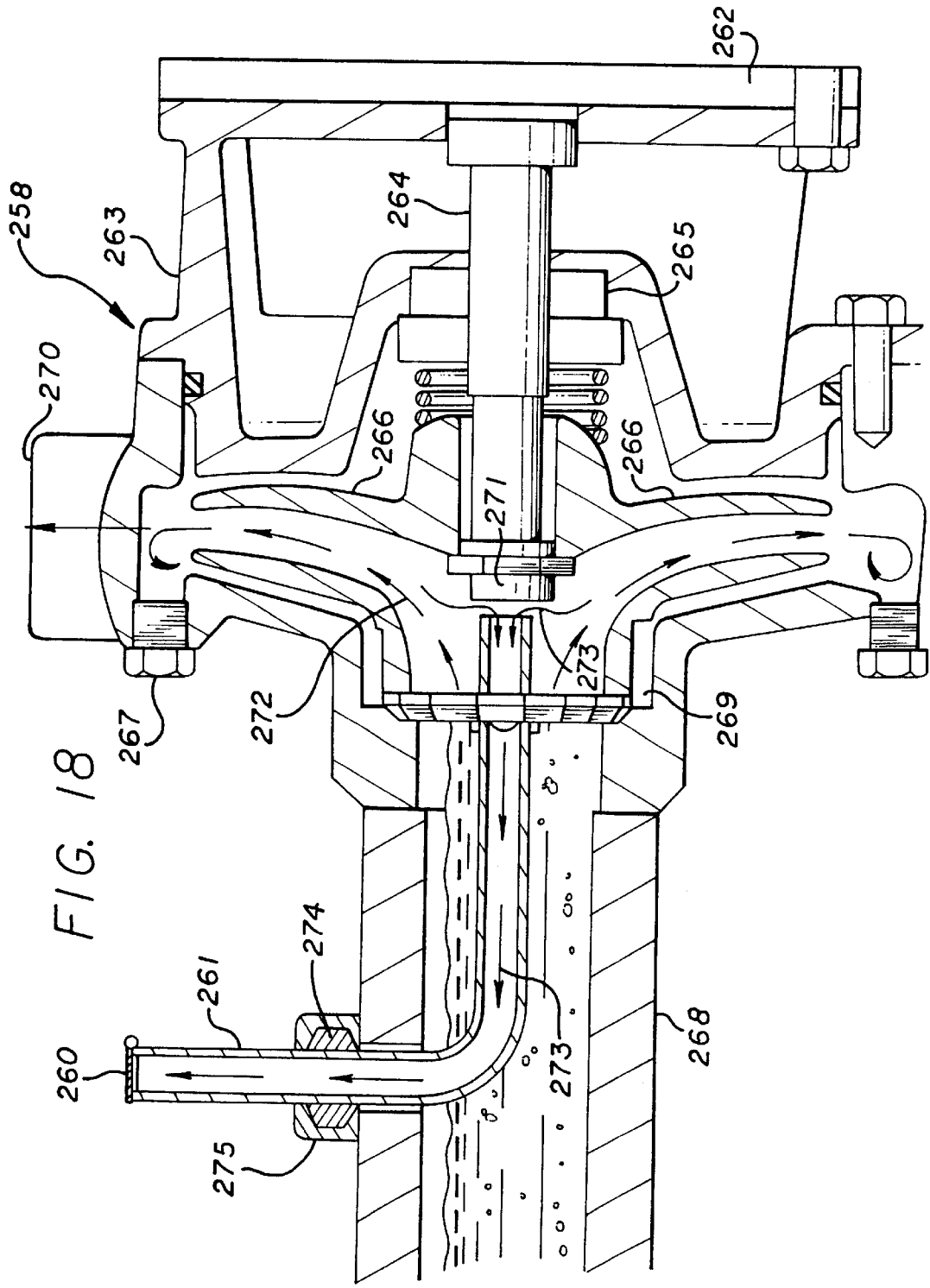
FIG. 18 is an enlarged cross-sectional view of a pressure pump assembly of the present invention used in the system of FIG. 3.

Referring to FIG. 18, it is seen that the solution to the problem is rather simple—a check valve 260 and a bleed tube 261 are added to the pump 258. Illustrated with reference numerals in this drawing figure are the following pump components: motor face 262, pump housing 263, motor shaft 264, shaft seal 265, impeller 266, static bleed port 267, suction line 268, wear ring 269, and discharge port 270. The bleed tube 261 is positioned at the eye of the pump 258 and close to the bolt head 271 to get all of the air out. The water flow is shown by arrow 272 and the air flow by arrow 273. Although there are bleed ports 267 at the extreme outer edges of the pump housing 263, they are only effective in a non-rotating system.

Thus, to bleed a centrifugal (rotating) pump in operation, the inventor has discovered that the air has to be bled from the eye of the pump 258. (See U.S. Pat. No. 4,981,413.) As the impeller 266 spins and there is no fluid flow through the pump 258, there is essentially a centrifuge which drives the heavier water to the outside, thereby displacing the air at the outside. The only place for the air to go is to the eye of the impeller 266, as shown by arrow 273. Once the air is burped out of the eye, the pump 258 begins to move fluid (water) again, as shown by arrow 272.

The bleed tube 261 passes upwardly out an opening in the suction line 268 and is secured in position thereto with a compression coupling ferrule 274 and a compression bonnet 275. The check valve 260 is a forward bias check valve positioned at the end of the bleed tube 261 and can be a flap valve or a small ball valve. Thus, this light touch (one to five psi) check valve 260 lets air out of the bleed tube 261 but not in and is needed because the venturi effect at the eye creates a vacuum tending to suck air into the pump.

The pump 258 can be the Model #3656 pump manufactured by Goulds Pumps, Inc. of Seneca Falls, N.Y. This pump has an impeller diameter of 8-1/16 inch and a size of 1-1/2×2–3. The air volume which causes this pump to lose it prime is two hundred to three hundred milliliters. That volume depends, however, on pump size, impeller design, fluid viscosity, fluid temperature, and so forth. Generally any pump which has a straight shot to its impeller so that a bleed tube can be positioned close to the impeller can be used. The majority of single-stage centrifugal pumps are of this type.

Figure 19:
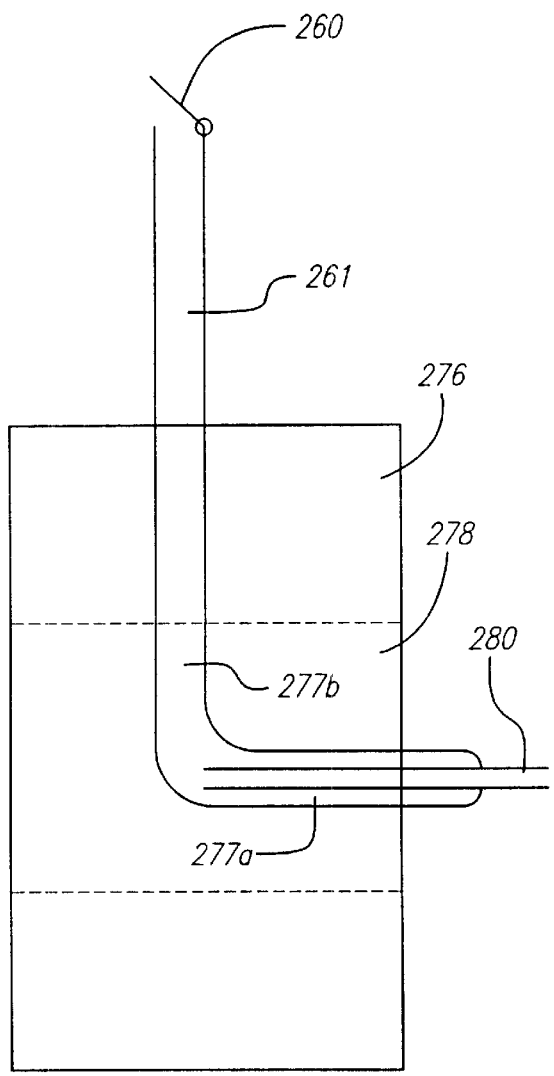
FIG. 19 is a side elevational view of a bleed-tube retrofit housing alternative useful in a pump assembly similar to that of FIG. 18.

One system for installing the bleed tube 261 and check valve 260 to the pump 258 is illustrated in FIGS. 20a–20e. For this system the bleed tube 261 is mounted in a retrofit housing 276, as best shown in FIG. 19. The horizontal portion 277a of the bleed tube 261 is mounted generally centered in a horizontal channel 278 through the retrofit housing 276. The bleed tube 261 can have a one-quarter inch diameter, while the channel 278 and suction line 268 have larger two inch diameters. The vertical portion 277b of the bleed tube 261 is secured in a top opening in the housing 276 with the check valve 260 disposed outside of the housing.

Figure 20A:
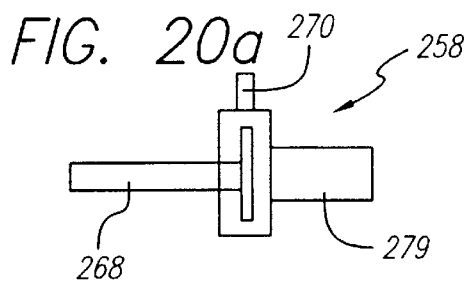
FIGS. 20a, 20b, 20c and 20d illustrate sequential steps for mounting the retrofit housing to an existing pump.
Figure 20B:
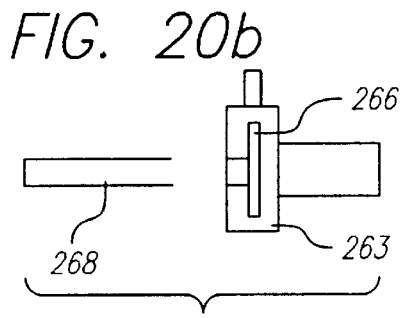
Figure 20C:
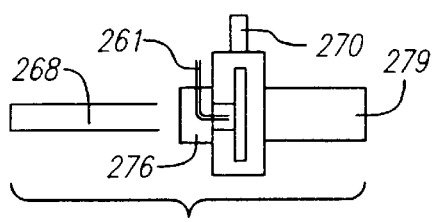
Figure 20D:
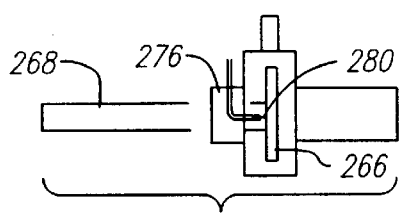

FIGS. 20a–20e show the steps of a retrofit process of the present invention. FIG. 20a shows the pump 258 to be retrofitted with its motor 279, impeller 266, discharge port 270, pump housing 263 and suction line 268. The suction line 268 is disconnected as illustrated in FIG. 20b. The retrofit housing 276 is then installed to the pump housing 263, as shown in FIG. 20c. The attachment can be by threaded means for smaller pumps (up to one thousand gallons per minute) and by flange means for larger pumps. Attachment clamps can also be used.

The effective length of the horizontal portion 277 of the bleed tube 261 is then adjusted by moving the inner tube 280, similar to a vehicle radio antenna. The inner tube 280 is moved until it terminates approximately one-eighth of an inch (as close as possible without touching) from moving parts of the impeller 266. On larger pumps, the installer can make this adjustment by sticking his hands physically into the suction line 268 or channel 278 and pushing the inner tube 280 towards the impeller 266. However, on smaller pumps, the installer may need to use angled needle nose pliers and a one-eighth inch feeler gauge.

Figure 20E:
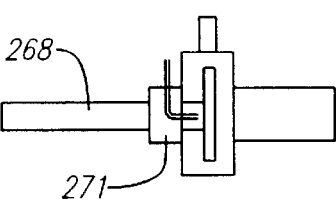

Instead of providing the adjustable inner tube 280, the horizontal portion 277 of the bleed tube can be extra long. And the installer can then cut it to fit. The suction line 268 is then mounted to the housing 276 as depicted in FIG. 20e, using threaded, flange or clamp means. The suction line 268 may first, however, have to be shortened to get a good connection.

The construction and operation of the sump 190 and related components will now be discussed with particular reference to FIGS. 21 and 22. The sump 190 is approximately twenty-eight feet long and thus extends about sixteen feet from the outlet end of the trough 120. The floor of the sump 190 is approximately a foot below the bottom of the trough 120. The trough 120 and sump 190 share a common inlet plate 284 through which the fluid jet conveyor 144 injects the bag transport fluid pressure.

A quiet backwater area 290 is defined in the sump 190 underneath the discharge conveyor 140 and to the end plate 294 of the sump. The suction line 230 sucks water from the backwater area 290 out through an opening in the end plate 294. Positioned in the backwater area 290 and depicted in FIGS. 21 and 22 are the drain 300, the fill float 304 (which keeps the water in the trough 120 at three-quarters full) and the overflow line 308 for the sump 190.

Figure 23:
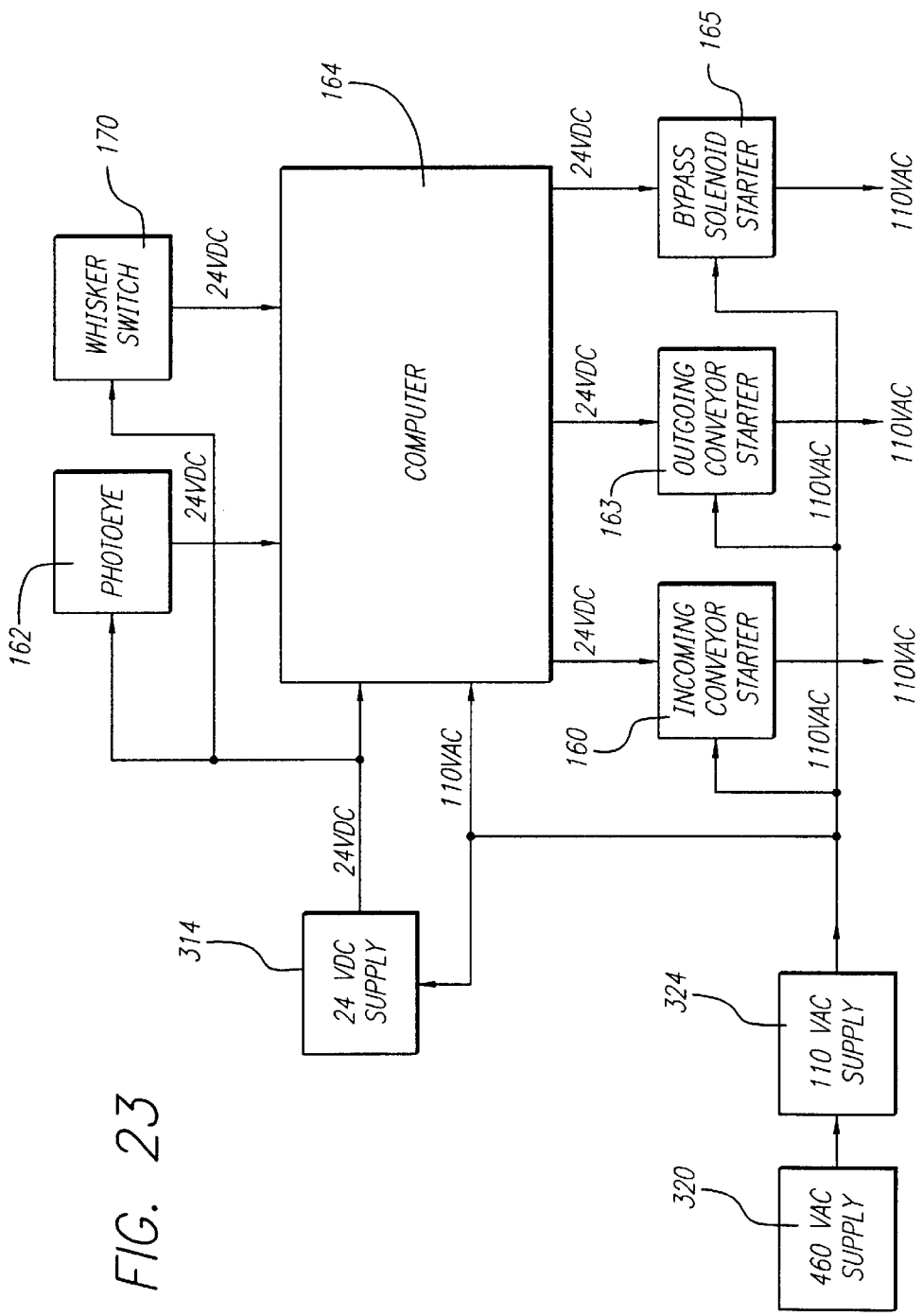
FIG. 23 is a block diagram of the computerized electrical system of the cooling system of FIG. 3.

Referring now to FIG. 23, all of the controls operate from a twenty-four volt DC supply 314. All of the one hundred and ten volt AC power comes from a four hundred and sixty volt AC supply 320, which is stepped down by a transformer to a one hundred and ten volt AC supply 324. The twenty-four volt DC control power comes from the one hundred and ten volt AC power supply 324 and the twenty-four volt DC power supply 314. The two discharge conveyors 140, 144 are powered by three phase, four hundred and sixty volt AC, and the two infeed conveyors 152, 112 are powered by one-phase, one hundred and ten volt AC. All of the power to the motors are switched using motor starters that use the twenty-four volt DC control voltage to power their coils.

Figure 26:
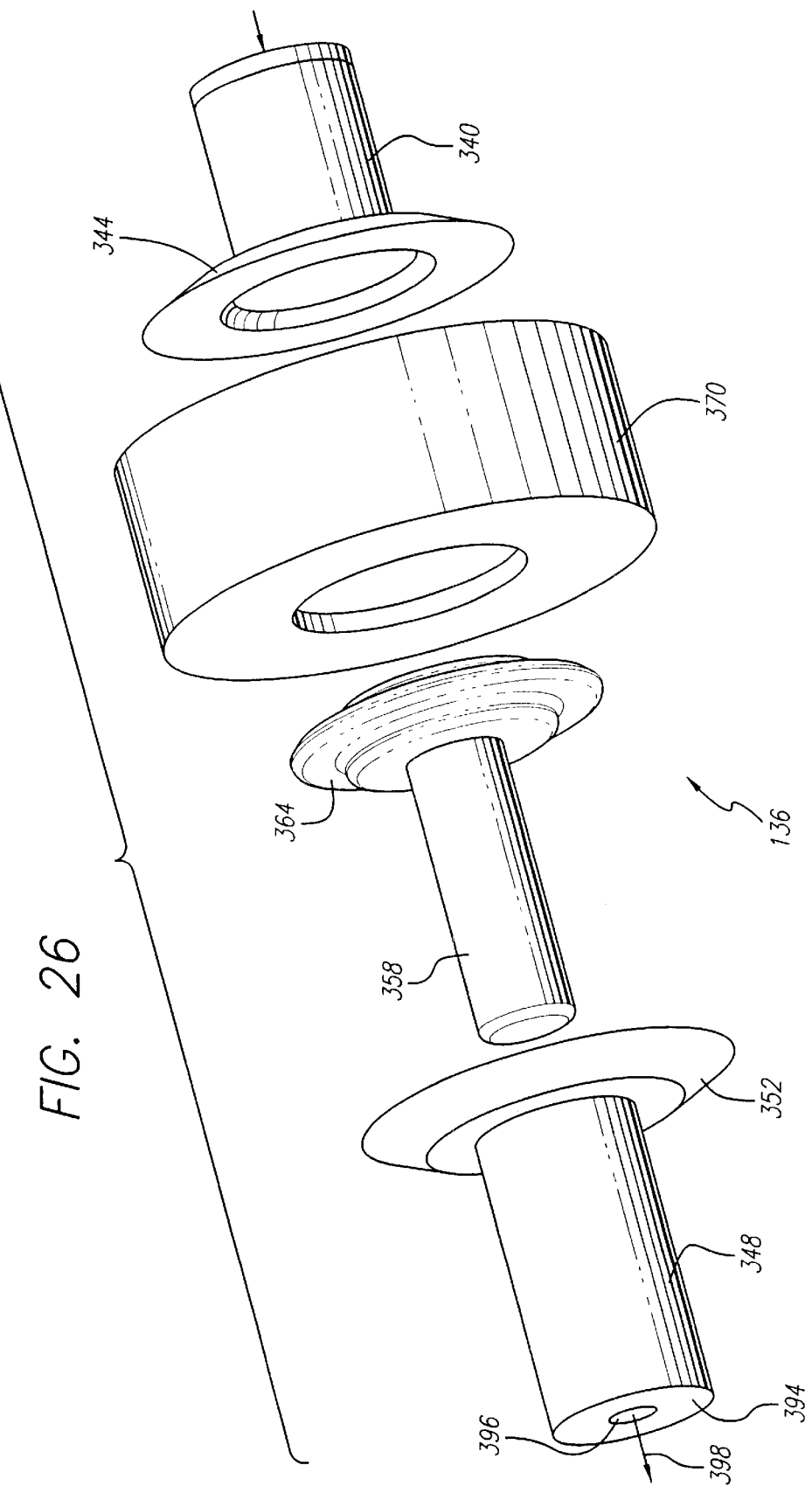
FIG. 26 is an enlarged exploded perspective view of one of the fluid jet nozzles of the system of FIG. 3 illustrated in isolation.
Figure 27:
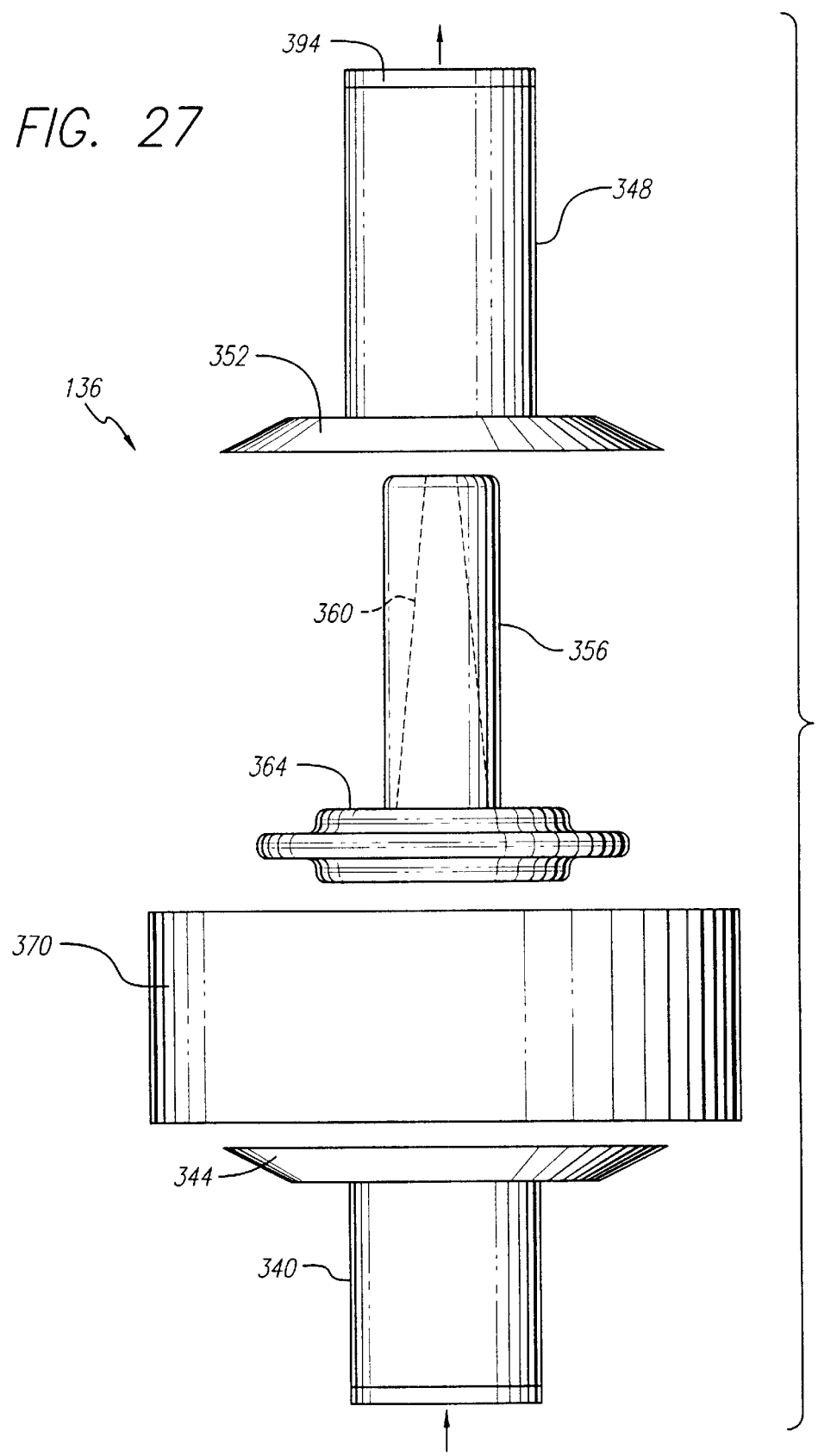
FIG. 27 is a top plan view of the nozzle assembly of FIG. 26.
Figure 28:
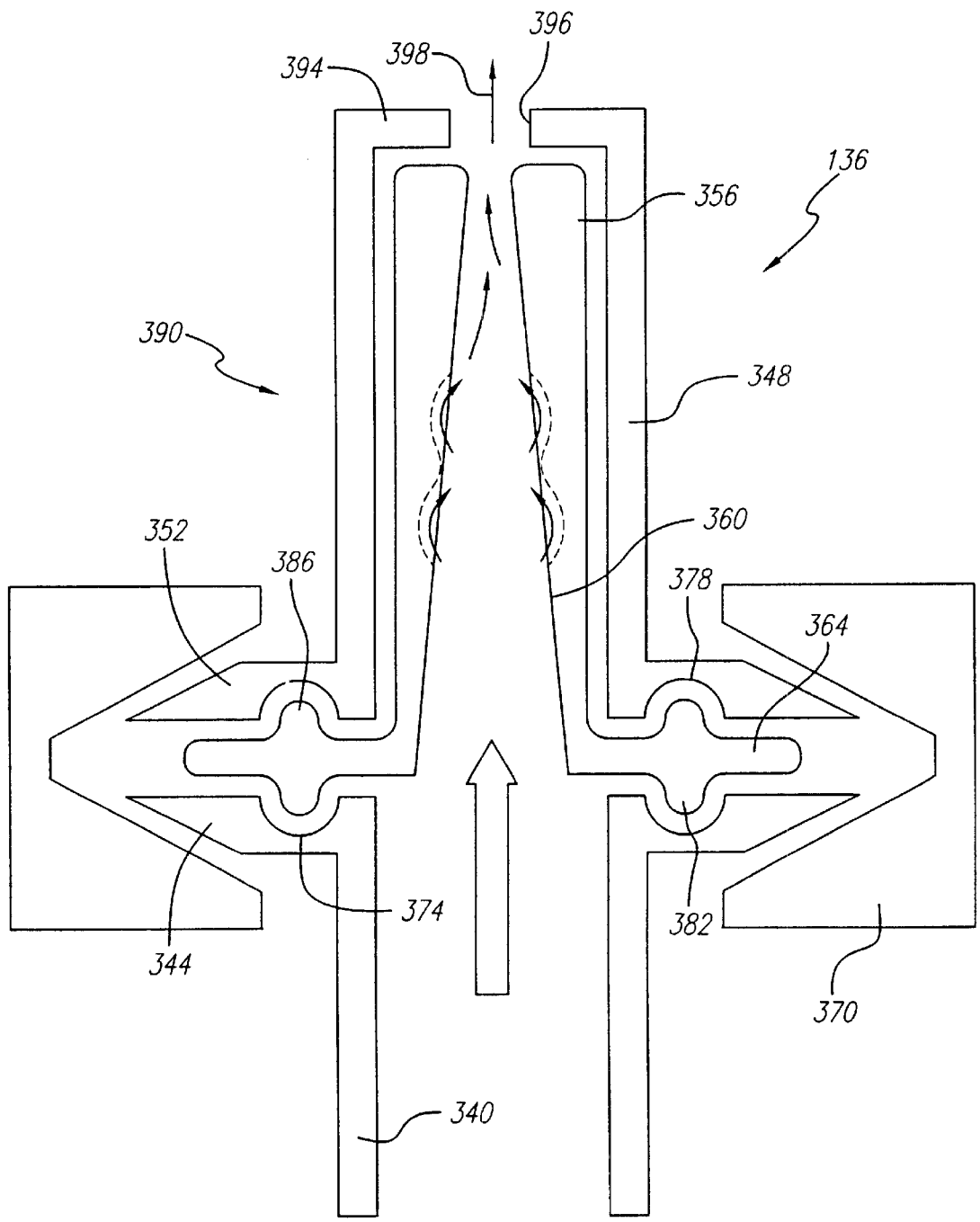
FIG. 28 is a cross-sectional assembled view of the nozzle assembly of FIG. 26.

A preferred nozzle (or nozzle assembly) 136 of the present invention is illustrated in isolation in FIGS. 26–28. Referring to these figures, the nozzle assembly 136 is seen to be formed of four parts. One of these parts in an inlet sleeve 340 having a TRICLOVER-type sanitary fitting 344 at its outlet end. Another of these parts is an outlet sleeve 348 having a TRICLOVER-type sanitary fitting 352 at its inlet end. The third of these parts is an elastomeric nozzle unit 356 having a tapered inner fluid contact surface 360 and an aft collar 364. And the fourth of these parts is a TRICLOVER clamp 370. Referring to FIG. 28, two fittings 344, 352 have respective grooves or indents 374, 378, which receive therein the circumferential cast-in rims 382, 386, respectively, on rearward and forward faces of the aft collar 364. The clamp 370 encircles the fittings 344, 352 holding them together with the collar 364 sandwiched therebetween.

The housing 390 defined by the two sleeves 340 and 348 has a lip 394 at its outlet end which prevents the nozzle unit 356 from extending out too far, and the lip 394 has a small (3/16 inch) opening 396 defining the outlet opening of the nozzle assembly 136. The housing 390 can be cast and machined out of stainless steel. The nozzle unit 356 can be made by casting or injection molding silicone or buna-n. It can have an inlet diameter of approximately one inch and a total length of approximately six inches. Alternatively, the various parts can be assembled by TIG welding. The materials used should be selected to meet the mechanical strength and corrosion resistance requirements of the particular use.

As shown in FIG. 28, the elastomeric contact surface 360 is deformed by eddies in the stream of fluid 398 to minimize turbulent flow through the nozzle assembly 136. The elastomeric lining is similar to the skin of a sea mammal in that it does not allow turbulence to feed back or build up on itself. Lower turbulence in the nozzle 136 means that higher power is delivered to the bag 108 with the same driving force. The elastomeric lining is also self-clearing of hard debris. In other words, as long as the pieces of debris are not too sharp or too big, the elastomer will "give" enough dimensionally so that the piece can slip by the orifice 396. In contrast, a hard lined nozzle would not "give" to allow large hard objects to pass through it.

The contact surface 360 of the nozzle unit 356 is tapered to gradually increase the velocity of the flow of the cooling or massaging fluid 398 therethrough. For example, the velocity can increase from an inlet velocity of approximately one foot per second to a high exit velocity of approximately ten feet per second. In other words, the exit velocity of the fluid stream can be approximately ten times that of the inlet velocity and with an improved focus.

As previously stated, the system 100 can be used to efficiently heat product in flexible bags instead of cooling it. It further can be used to heat product in sealed flexible bags and then cool the heated product in the bags. The basic steps of a heating and cooling system are shown generally at 420 in FIG. 30. Referring thereto, the raw product 424 is filled in bags formed from bag material 428 at a form/fill/seal station 432. The filled and sealed bags 434 are then passed through a heating trough 436 where the heating fluid (water) is heated by a heat source 440, as will be discussed later in greater detail with the discussion of FIG. 32. The heated bags are then delivered to and passed through a cooling trough 444 where they are subjected to a cooling solution 448 (as described previously for system 100).

Figure 32:
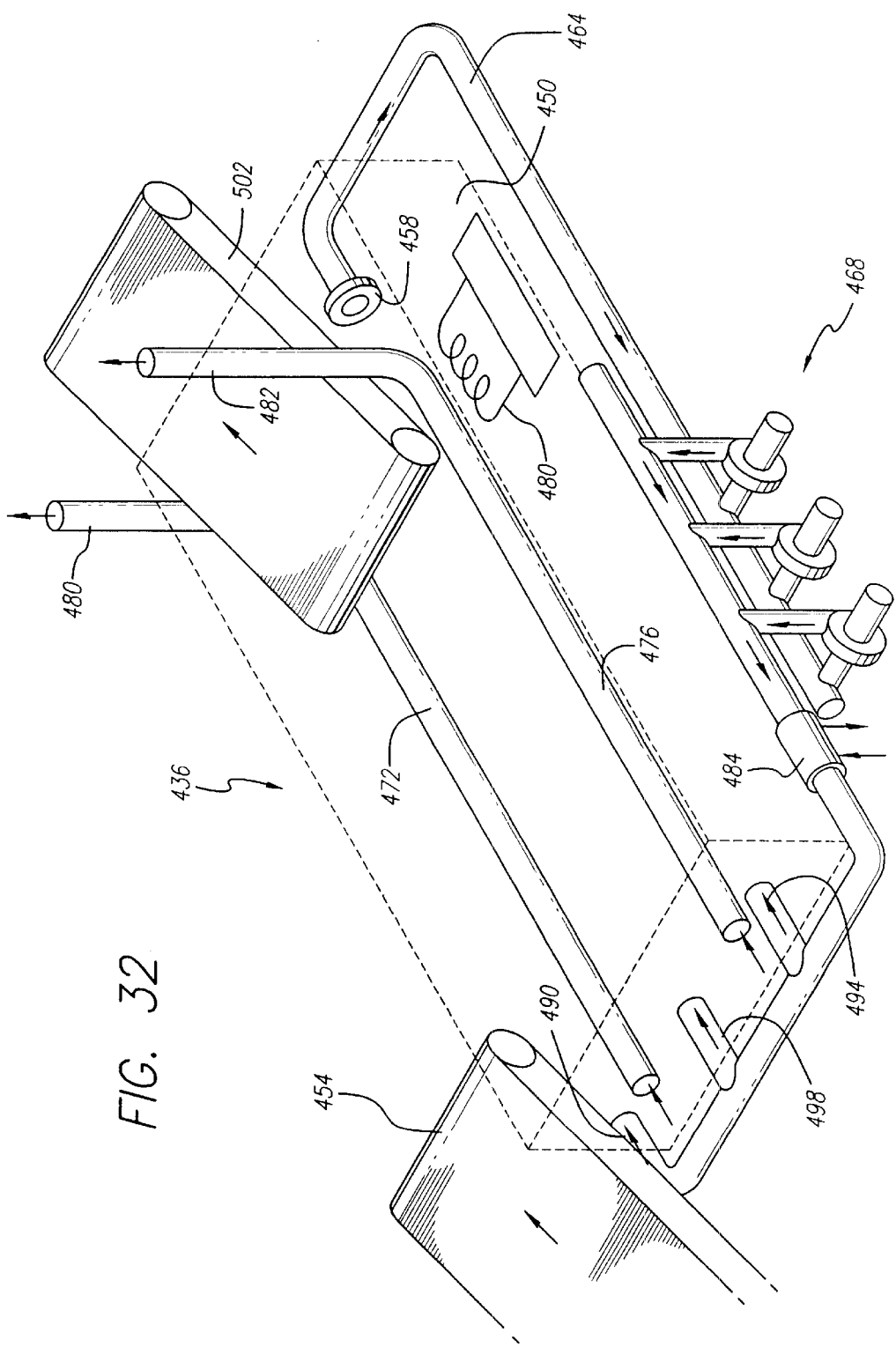
FIG. 32 is a simplified perspective view of a heating trough of the system of FIG. 30.

An exemplary heating trough 436 is shown in simplified form in FIG. 32. The sump vessel 450 (similar to sump 190) is shown, but for illustrative purposes the perforated trough (120) in the vessel is not shown. Also not shown in this figure (but shown in other earlier figures) are the two rows of heating jets, which would be positioned on opposite sides of the trough. Thus, the product filled and sealed bags (as will be described later) are carried by the infeed conveyor 454 and deposited into the trough in the sump vessel 450. The water in the vessel 450 is sucked out outlet 458 at an end of vessel 450, through pipe 464 by high pressure pumps 468.

Three different heat sources (440) for the water are illustrated in FIG. 28. Although they are preferably alternative heat sources (that is, only one would be used), it is within the is scope of this invention to use two or more if desired. One heat source uses fire tubes, such as shown by reference numerals 472, 476, submerged in the water in the vessel 450. Hot combustion gases forced through the fire tubes 472, 476 heat the surrounding water and the gases are discharged out the flues 480, 482. A second heat source (440) can be an electric immersion heater 480 positioned to heat the water in the vessel 450. And a third heat source includes passing the pipe 464 through a heat exchanger 484 to heat the water flowing therethrough. The heat exchanger 484 can be a water-tube boiler where hot flue gases pass over the pipe (or plurality of tubes) within a furnace enclosure, thereby heating the water, and then the flue gases are exhausted out through a stack.

The hot water in the pipe 464 passes to the two pipes 490 and 494 of the nozzle system and to the fluid jet conveyor 498, similar to the system provided in the earlier-described (cooling) troughs. The nozzles then direct the hot water against the bags providing the massaging and rotating action as previously described to efficiently heat the bag contents. And the jet conveyor 498 conveys the bags along the trough as previously described to the trough end. At the trough end a discharge conveyor 502 removes the bags from the trough and conveys them to the cooling trough 444. Special precautions are taken in the design and operation of the heating trough 436 to insure that the operator thereof is not scalded by the boiling water. The clear cover used for the cooling trough may be replaced by a metal (opaque) cover.

Heating and cooling system 420 is a commercially important system because it allows product to be sterilized and cooled in bags, which can be subsequently boxed. This process is considerably cheaper and better for the environment than the current process of using cans. Particularly, it allows one gallon cans to be replaced with one gallon bags, which are shipped in boxes (similar to wine bags in boxes). If the relatively expensive spouts are eliminated and the bags sealed closed, then the present bag-in-a-box system provides a very economical replacement for cans.

The bags are made without fill spouts by making them from a continuous roll of bag material preferably using the prior art PENTA PAK SYSTEM equipment as illustrated generally in FIG. 31. A portion of the sheet material 428 unwound from the roll is folded onto itself, sealed transversely along the bottom edge and sealed along the overlapped longitudinal edges. A tube is thereby formed which is closed at the bottom edge and open at the top. Raw product (424) is then poured in through the open top. The top is sealed along a top edge, and the material cut above the top seal. And the process continues to form the next filled and sealed bag, and so forth. This process allows the bag to be sealed before the product (424) is heated, which is advantageous because sealing cannot be controlled well when the product is hot.

More particularly and referring to FIG. 31, the plastic material 428 is unrolled off of a film roll 504 over a collar (much like a shirt collar) and the flat stock is automatically formed into an unsealed tube. As the tube travels down vertically, it slides past a longitudinal sealing bar 508 which joins the two lapping edges in the back in a longitudinal seal 512 (a potato chip bag is a good example where the seam that runs straight down the back is the longitudinal seal). Transverse seals 516, 520 across the top and bottom of the bag are made with two retractable sealing jaws or bars 524, 528 with a retractable knife blade 532 between. The traverse sealing bar assembly on vertical carriage 536 moves up past the sealed tube when its jaws are open. At the top of the upward stroke (the length is determined by the desired bag length) the heated jaws 524, 528 close and start sealing the bag. With the jaws still closed, the jaw assembly or carriage 536 moves downward to pull more bag material 428 off the roll 504 and over the collar and past the longitudinal seal bar 508.

As the traverse sealing bar assembly nears the lower end of its stroke, the knife blade 532 extends between the two sealing bars 524, 528 to cut and separate the top of the first bag from the bottom of the second bag. The jaws 524, 528 then open, the first (lower) bag 540 drops onto a conveyor 454, and the jaw assembly starts upward to make another bag. As the sealing jaw is moving to its upward position, the product 424 to be packaged is dropped into the neck of the collar and slides down to the seal that was just formed by the last jaw closure in the bottom of the new bag. This process works well for room temperature products 424, but not for hot filling since the heat from the product within interferes with the sealing process. That is a reason why filling cold then heating and cooling pursuant to this invention is such a valuable invention.

There is no scale limit for system 420. It can be scaled down to process individual ketchup pouches or scaled up to process bags the size of large railroad cars. The fluid dynamics would change, but the systems would have be tailored to each product in any event.

The heating trough 436 would be very similar to the system 100 and would utilize the principles thereof including the massaging and rotating of the flexible bags in the heat transfer fluid. Of course, the main difference is that a (sterilizing) heating fluid would be used instead of a cooling fluid. Thus, the cooling tower (242) would be replaced with a heating system (440). This means that the components of the system which would be exposed to the high boiling temperatures would have to be made of suitable materials. For example, the pressure manifold (128, 132), suctions lines (230) and jets (136) would be made of metal, such as stainless steel, instead of PVC. Also, take-up rollers would be needed to compensate for the large thermal expansion of the plastic of the polypropylene conveyor belting.

The sterilization in the heating trough 436 raises the temperature of the product from ambient to one hundred ninety-five to two hundred degrees Fahrenheit, using only two hundred and eight degree fluid. This takes time, probably ten or fifteen minutes to heat a fifty-five gallon bag 428. In contrast, the cooling trough 444 takes the product from two hundred degrees to one hundred and twenty degrees, but uses seventy degree water. Thus, the cooling only takes five minutes. This means that the heating trough 436 must be two to three times as long as the cooling trough 444. It thus may have approximately nine active massaging and rotating stations.

Figure 33:
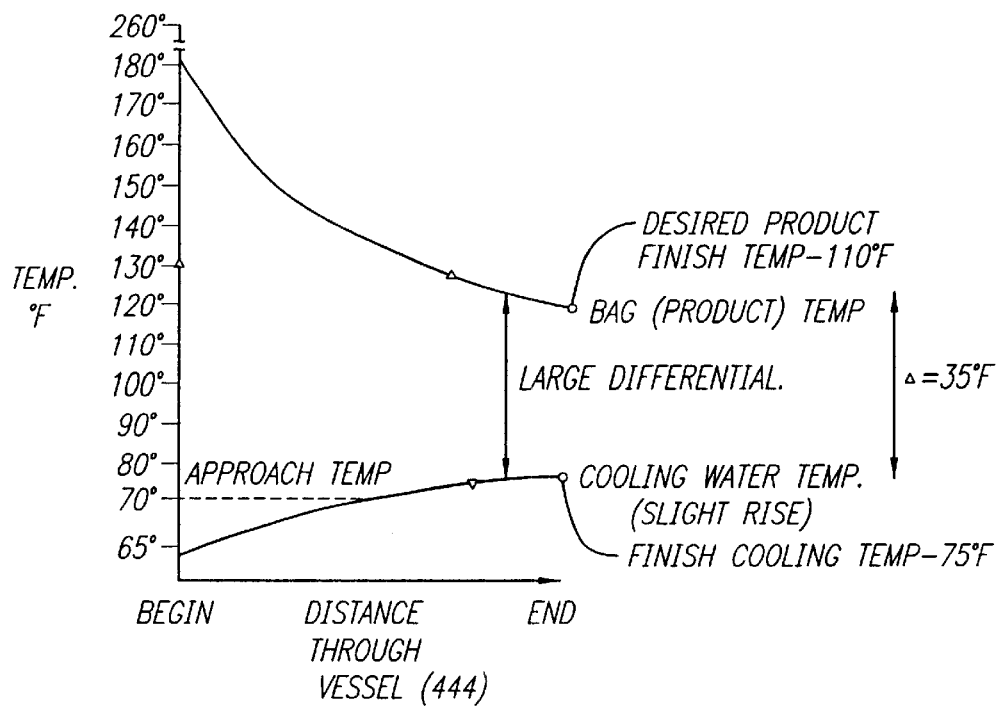
FIG. 33 is a temperature graph of the cooling portion of the system of FIG. 30.
Figure 34:
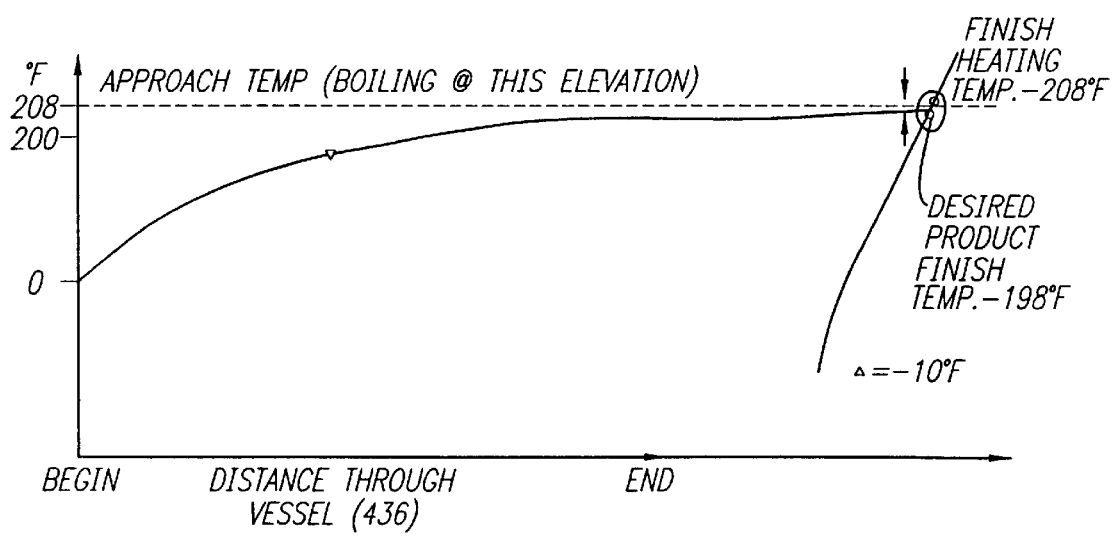
FIG. 34 is a temperature graph of the heating portion of the system of FIG. 30.

The large difference between the time to heat and the time to cool can be readily understood from FIGS. 33 and 34. FIG. 33 shows the situation in the cooling trough 444 where there is a large difference in the temperature between the product in the bag and the vessel solution. This means that there is always a large driving force and therefore a large heat transfer across the bag film. In contrast, FIG. 34 shows the situation in the heating trough 436, where only a ten degree Fahrenheit difference between the temperatures of the product and the heating solution is left. Therefore the driving force for heat transfer is much less, and consequently the time to reach the desired temperature in the bag is about three times longer for heating than cooling. To significantly raise the temperature of the heating solution is likely not commercially practical.

Thus, the heating trough 436 will be about three times longer than the cooling trough 444 in system 420 if water at atmospheric conditions is used as the heat transfer solution. The heating trough 436 can be three cooler-sized troughs (120) running end to end (in series) or parallel into a cooling trough running three times faster. In either case the heating volume will be three times larger than the cooling volume. If the bags are run in series, there would be nine active stations in the heating trough 436. The system can also be designed so that there are fewer active stations with more time spent at each station, but a single file unit would likely then be used to combine parallel tubes into one row before entering the cooling trough 444.

For a fifty-five gallon bag of diced tomatoes, approximately fifteen minutes is needed to heat to a sterilization temperature of one hundred ninety-five to two hundred degrees, starting at a seventy degree temperature. Although hold time at a sterilization temperature varies for each product and container, it will typically be eight minutes for a fifty-five gallon bag with a fill spout when the bag is "hot filled" (product heated in a heat exchanger and dumped into a cold bag and capped with a cold cap). Without a fill spout that time can probably be reduced to four minutes. The reason for that reduction is that the fill spout is a large piece of plastic and plastic is a thermal insulator. While the product probably only needs two minutes at sterilization temperature to be sterilized and the bag probably needs the same, the fill spout probably requires four minutes. Therefore, the system comprised of the product (heated in a heat exchanger and delivered to the bag) plus bag plus spout requires eight minutes of hold after assembly.

Heating after assembly of the package allows for container heating in parallel with product heating. So the hold time in a bag with or without a fill spout can likely be reduced to two minutes after leaving the heating section. It would be most practical to size the heating vessel so that the hold time is accomplished in the dead zone of the vessel. The big time saving is in heating the fill spout (the longest time requirement) while the product is being heated. The total dwell time in the heating trough will probably be fifteen to eighteen minutes for a fifty-five gallon bag of tomatoes and most other common foodstuffs.

The bag material only needs to hold a slight vapor pressure within the bag in system 420. Using water as the heating fluid that is open to atmospheric pressure means that any boiling will occur in the water and not the foodstuff or other product. Since the heat source is the heating fluid and not the foodstuff, the temperature will always be slightly higher in the vessel (120) than the bag. Therefore any tendencies to flash will be in the fluid and not the foodstuffs. The bag only has to hold a pressure slightly higher than atmospheric to prevent flash to vapor (boiling) within the bag.

A system, pursuant to this invention, that uses a heating fluid with a boiling temperature higher than that of the bag contents requires careful monitoring so that the bags are not exploded. On the other hand, a system that uses a heating fluid whose boiling point is equal to or lower than that of the bag contents would be intrinsically safe. The heating fluid likely has a lower boiling point than the foodstuff within because the water is relatively pure when compared to the bag contents. Pure water boils at a lower temperature than water that has salts (from the food) dissolved in it.

The lower the viscosity of the product 424 to be heated, the less horsepower required to circulate the contents. As the viscosity increases, the horsepower delivered to the bag must increase. The strength of the bag limits the amount of horsepower that can be delivered to the bag. High water content of the product 424 is not required. Even dry products can be heated as long as they have a fluid flowable consistency.

The product (424) is not limited to foodstuffs, such as tomatoes, peppers and peaches. The product, for example, can be certain medical products that need sterilization. Products that need heating to be "finished" can be processed in this system, such as a chemical reaction that may be catalyzed by heating and that cannot be conveniently bagged after that reaction. Also, system 420 would allow manufacturers, such as chemical manufacturers, to work easily with highly corrosive materials without using expensive anti-corrosion heat exchangers and piping systems by processing the materials in flexible bags.

From the foregoing detailed description, it will be evident that there are a number of changes, adaptations and modifications of the present invention which come within the province of those skilled in the art. For example, certain features of this invention can be used to heat or cool contents of rigid (as opposed to flexible) containers. However, it is intended that all such variations not departing from the spirit of the invention be considered as within the scope thereof.

What is claimed is:

1. A system for processing product, comprising:
   heating means for heating product in a closed flexible container, the heating means, while heating the product, rotating and massaging the flexible container and thereby moving product at a central location in the flexible container towards a periphery hereof to promote faster heating of the product, said heating means comprising first and second opposing and offset hot fluid jets which rotate the flexible container therebetween.

2. The system of claim 1 wherein the heating means includes a heating trough and uses a heating liquid which contacts the flexible container in the heating trough to heat the product.

3. The system of claim 2 wherein the heating means includes a fluid jet conveyor which uses the heating liquid to move the flexible container from one heating station to another heating station in the heating trough.

4. The system of claim 3 wherein the heating means includes first and second opposing and offset hot fluid jets which rotate the flexible container therebetween at each of the heating stations.

5. The system of claim 2 wherein the heating means includes a fire tube in the heating liquid which heats the liquid.

6. The system of claim 5 wherein the heating means includes a sump, the heating trough is disposed in the sump and the fire tube is in the sump.

7. The system of claim 2 wherein the heating means includes a pipe and a heat exchanger which heats the heating liquid passing through the pipe.

8. The system of claim 2 wherein the heating means includes an electric immersion heater which heats the heating liquid.

9. The system of claim 8 wherein the heating means includes a sump, the heating trough is disposed in the sump and the electric immersion heater is disposed in the sump.

10. The system of claim 1 further comprising cooling means for cooling the product in the flexible container after the product has been heated by the heating means.

11. The system of claim 10 wherein the cooling means includes first and second opposing and offset cool fluid jets which rotate the flexible container therebetween.

12. The system of claim 10 wherein the heating means includes a heating trough and the cooling means includes a cooling trough.

13. The system of claim 12 further comprising a mechanical conveyor which conveys the flexible container from the heating trough to the cooling trough.

14. The system of claim 12 wherein the heating trough is approximately two to three times as long as the cooling trough.

15. The system of claim 10 wherein the heating means includes a plurality of serially-arranged heating troughs and the cooling means includes a single cooling trough.

16. The system of claim 12 wherein the cooling means includes opposing and offset fluid jets which direct fluid at the flexible container when therebetween and in the cooling trough.

17. The system of claim 1 wherein the heating means heats the product to a sterilization temperature thereof.

18. The system of claim 1 further comprising sealing means for filling and sealing the flexible container with cold or ambient product before the container and the product therein are subjected to the heating means.

19. The system of claim 18 wherein the sealing means includes form/fill/seal equipment.

20. The system of claim 18 wherein the sealing means forms transverse seals at both ends of the flexible container.

21. A system for processing flowable product in flexible a containers, comprising:
    a heating trough;
    first means for conveying the flexible containers into, along and out of the heating trough;
    a cooling trough; and
    second means for conveying the flexible containers from the heating trough, into, along and out of the cooling trough and further comprising fluid jet nozzles disposed to direct fluid against sides of the flexible container, when in the heating trough, and thereby move product in a central area of the flexible containers towards the container surfaces and thereby promote efficient heating of the product.

22. The system of claim 21 wherein the flexible containers are sealed closed before being conveyed to the first means.

23. The system of claim 21 wherein the fluid jet nozzles are opposing and in offset planes relative to a fluid container therebetween and thereby when activated causing the fluid container to rotate.

24. The system of claim 23 wherein the first means comprises a hot fluid jet conveyor.

25. The system of claim 21 wherein the second means includes a mechanical conveyor which conveys the flexible containers from the heating trough to the cooling trough and a fluid jet conveyor which conveys the flexible containers along the cooling trough.

26. The system of claim 21 wherein the heating trough includes a hot liquid bath for the flexible containers, and further comprising flexible container massagers associated with the hot liquid bath.

27. A method of processing product, comprising the steps of:
    filling a flexible container with cold or ambient product;
    sealing the filled container;
    after the sealing step, heating the product in the sealed container to a sterilization temperature; and
    after the heating step, cooling the sterilized product in the sealed container to a substantially ambient temperature wherein the heating step includes massaging the product in the sealed container such that product in a central portion of the container moves towards a periphery thereof, while the container is in a hot fluid bath.

28. The method of claim 27 wherein the heating step includes dispensing hot fluid from at least first and second opposing and offset hot fluid nozzles at the flexible container therebetween.

29. The method of claim 27 wherein the heating step includes passing the flexible container along a fluid trough and rotating the flexible container about an axis generally parallel with a longitudinal axis of the fluid trough.

30. The method of claim 27 wherein the cooling step includes massaging the product in the sealed container such that product in a central portion of the container moves towards a periphery thereof, while the container is in a cool fluid bath.

31. The method of claim 27 wherein the product is a flowable foodstuff.

32. A method of processing product, comprising the steps of:

filling a flexible container with cold or ambient product;

after the filling, closing the flexible container; and heating the product in the closed flexible container using a hot fluid to a sterilization temperature, the heating includes massaging the flexible container to promote heating of product in a central area of the flexible container by the hot fluid.

33. The method of claim 32 wherein the massaging includes impacting sides of the flexible container with jets of hot liquid.

34. The method of claim 33 wherein the closing includes sealing the flexible container closed.

* * * * *